United States Patent
Schneider et al.

(10) Patent No.: US 12,521,809 B2
(45) Date of Patent: Jan. 13, 2026

(54) METHODS AND APPARATUS TO SYNERGICALLY CONTROL A WELDING-TYPE OUTPUT DURING A WELDING-TYPE OPERATION

(71) Applicant: Illinois Tool Works Inc., Glenview, IL (US)

(72) Inventors: Joseph C. Schneider, Appleton, WI (US); Robert R. Davidson, New London, WI (US); Craig Steven Knoener, Appleton, WI (US); Charles Ace Tyler, Neenah, WI (US); Thomas A. Bunker, DePere, WI (US)

(73) Assignee: Illinois Tool Works Inc., Glenview, IL (US)

( * ) Notice: Subject to any disclaimer, the term of this patent is extended or adjusted under 35 U.S.C. 154(b) by 473 days.

(21) Appl. No.: 17/182,376

(22) Filed: Feb. 23, 2021

(65) Prior Publication Data

US 2021/0299774 A1  Sep. 30, 2021

Related U.S. Application Data

(60) Provisional application No. 63/002,715, filed on Mar. 31, 2020.

(51) Int. Cl.
*B23K 9/095* (2006.01)
*B23K 9/10* (2006.01)
(Continued)

(52) U.S. Cl.
CPC .......... *B23K 9/0953* (2013.01); *B23K 9/1006* (2013.01); *B23K 9/124* (2013.01); *B23K 9/16* (2013.01); *B23K 9/23* (2013.01)

(58) Field of Classification Search
CPC .... B23K 9/0953; B23K 9/1006; B23K 9/124; B23K 9/16; B23K 9/23; B23K 9/09;
(Continued)

(56) References Cited

U.S. PATENT DOCUMENTS 9,506,958 B2 * 11/2016 Davidson ............. B23K 9/1006
9,925,613 B2 *  3/2018 Rozmarynowski .. B23K 9/1043
(Continued)

FOREIGN PATENT DOCUMENTS

EP  3753664  12/2020

OTHER PUBLICATIONS

European Office Communication with Search Report Appln No. 21164457.0 dated Sept. 8, 2021.
Canadian Office Action Appln. No. 3,110,994 dated Jun. 6, 2024.

*Primary Examiner* — Vy T Nguyen
*Assistant Examiner* — Abigail H Rhue
(74) *Attorney, Agent, or Firm* — McAndrews Held & Malloy, Ltd.

(57) ABSTRACT

An example welding-type power supply includes power conversion circuitry configured to convert input power to welding-type power and to output the welding-type power to a welding-type torch; communications circuitry configured to receive a control signal representative of a value within a predetermined range of values from a remote control device during a welding-type operation; and control circuitry configured to: determine, based on at least one physical characteristic of a welding operation, a first limit range of a voltage, a current, or a wire feed speed and a second limit range of a second one of the voltage, current, or wire feed speed; and synergically control the first and second ones of the voltage, current, or wire feed speed within the first and second limit ranges based on the value of the control signal, (Continued)

wherein the first and second limit ranges are mapped to the predetermined range of values.

14 Claims, 12 Drawing Sheets

(51) Int. Cl.
*B23K 9/12* (2006.01)
*B23K 9/16* (2006.01)
*B23K 9/23* (2006.01)

(58) Field of Classification Search
CPC ...... B23K 9/095; B23K 9/956; B23K 9/1062; B23K 9/173; G01R 19/2506
USPC .................................. 219/121, 74, 75, 130
See application file for complete search history.

(56) References Cited

U.S. PATENT DOCUMENTS

| | | | |
|---|---|---|---|
| 2005/0173393 A1* | 8/2005 | Nowak | B23K 9/124 |
| | | | 219/137.71 |
| 2013/0234978 A1* | 9/2013 | Ksondzyk | G06F 3/04182 |
| | | | 345/174 |
| 2014/0001169 A1* | 1/2014 | Enyedy | B23K 9/173 |
| | | | 219/137.71 |
| 2016/0311045 A1* | 10/2016 | Sickels | B23K 9/095 |
| 2018/0126477 A1* | 5/2018 | Kooken | B23K 9/1336 |
| 2019/0070689 A1 | 3/2019 | Bunker | |
| 2019/0329345 A1 | 10/2019 | Davidson | |

* cited by examiner

| Steel, 0.35" Wire Diameter ||||
|---|---|---|---|
| Input Value | Voltage | WFS (ipm) | Mode |
| 1 | 14.0V | 90 | CSC |
| 2 | 14.1V | 95 | CSC |
| 3 | 14.2V | 100 | CSC |
| ... | ... | ... | ... |
| 51 | 18.1V | 220 | Short Arc |
| 52 | 18.2V | 225 | Short Arc |
| ... | ... | ... | ... |
| 95 | 24.6V | 400 | Spray |
| 96 | 24.7V | 410 | Spray |
| 97 | 24.8V | 420 | Spray |
| 98 | 24.9V | 430 | Spray |
| 99 | 25.0V | 440 | Spray |
| 100 | 25.1V | 445 | Spray |
| ... | ... | ... | ... |

| Steel, 0.35" Wire Diameter |||
|---|---|---|
| Input Value | Trim | WFS (ipm) |
| 10-25 | 50 | 300 |
| 26-50 | 30 | 350 |
| 51-75 | 60 | 250 |
| 76-99 | 50 | 400 |
| 100 | 60 | 400 |

METHODS AND APPARATUS TO SYNERGICALLY CONTROL A WELDING-TYPE OUTPUT DURING A WELDING-TYPE OPERATION

RELATED APPLICATIONS

The present application claims the benefit of U.S. Patent Application Ser. No. 63/002,715, filed Mar. 31, 2020, entitled "METHODS AND APPARATUS TO SYNERGICALLY CONTROL A WELDING-TYPE OUTPUT DURING A WELDING-TYPE OPERATION." The entirety of U.S. Patent Application Ser. No. 63/002,715 is expressly incorporated herein by reference.

BACKGROUND

This disclosure relates generally to welding and, more particularly, to methods and apparatus to synergically control a welding-type output during a welding-type operation.

SUMMARY

Methods and apparatus to synergically control a welding-type output during a welding-type operation are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
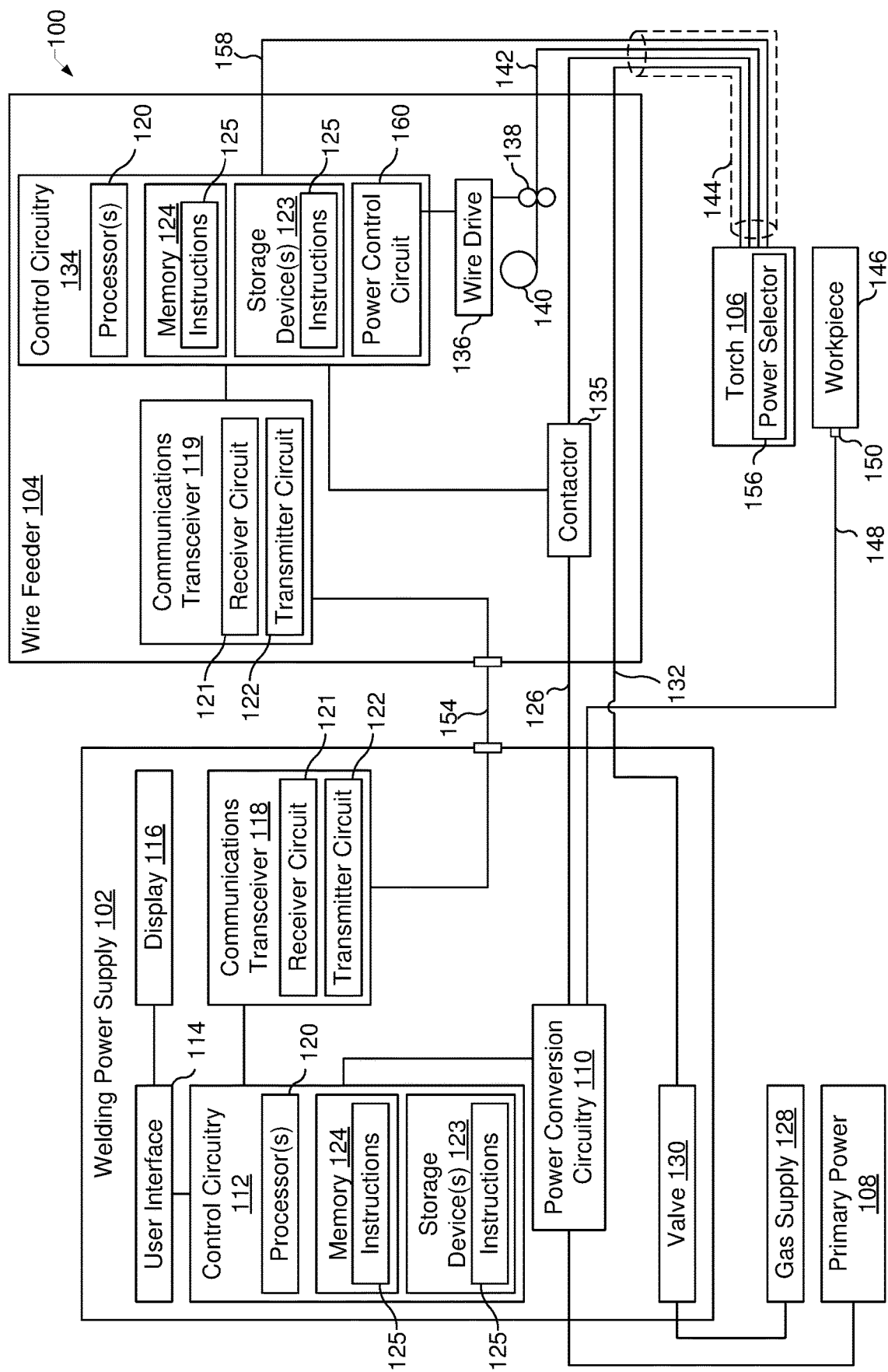
FIG. 1 is a block diagram of an example welding-type system including a remote wire feeder and configured to provide synergic power control, in accordance with aspects of this disclosure.

Gas Metal Arc Welding (GMAW), also referred to as MIG welding, is conventionally performed with a wire feed speed and voltage that is preselected prior to performing a weld. For instance, conventional welding power supplies may be controlled via knobs or buttons on the front panel of the welding power supply. If the operator selects too little power, the resulting weld may lack fusion and the weld may fail. Conversely, if the operator selects too much power, burn-through of the material may occur, creating a hole instead of a welded joint.

Some conventional welders, such as the Millermatic® 211 Auto-Set™ MIG Welder from Miller Electric Mfg. Co., makes the task of selecting weld parameters easier by permitting the operator to select both wire feed speed and voltage based on the wire size and material thickness. Preselection of the welding parameters is effective when the workpiece is of a uniform thickness and geometry, but in some situations the workpiece may have varying thickness and/or geometry. For instance, if an operator is welding a workpiece in which the workpiece progressively narrows, the heat sink capability of the metal is reduced and using the same power settings for the entire distance may result in burn-through and creating a hole.

Disclosed example methods and apparatus provide a welding-type power supply for GMAW welding that enables an operator to synergically adjust the output power during welding. An example method of synergic adjustment by an operator involves manipulating a control on the torch that is easily accessible to the operator during welding.

Where conventional welding-type power supplies may provide recommended voltage and wire feed speed, and permit a user to vary the voltage and/or wire feed speed within a specified narrow range, disclosed examples provide a control device that permits the operator to adjust the output power of a GMAW welding-type power supply over a wide operation range. For example, a manually adjustable control on the weld torch may be provided to adjust the power synergically by simultaneously changing the output voltage and the wire feed speed to raise or lower the output power to suit the work conditions and the weldment. The example welding torch, and the attached power supply and/or remote wire feeder, changes the welding output power and/or the wire feed speed while the operator is welding with an easy to use method such as a variable-input (e.g., analog input) trigger.

Some example methods and apparatus further automatically change a mode of operation or deposition mode during welding, such that the operator can change processes on-the-fly in a continuously variable manner, such that the operator has a very wide operating range of the output power. For example, if the operator wants to go from a first power operation or deposition mode (e.g., short arc welding) to a higher power operation or deposition mode (e.g., pulse spray welding), such as if the operator encounters an increase in the thickness of the work piece being welded, a power control circuit may follow a synergic control scheme to slowly raise the output voltage and the wire feed speed until the wire transitions from a short arc condition to a pulsed spray condition. In another example scenario, the power control circuit may allow the operator to transition from a first power operation or deposition mode (e.g., short arc welding) to a lower power operation or deposition mode (e.g., Regulated Metal Deposition (RMD™)). Disclosed examples enable an operator to enter other deposition modes, such as a Controlled Short Circuit (CSC) process, and/or arcless 'hotwire' deposition. An operator may change between the different deposition modes on-the-fly during a welding operation to finely control wire deposition and/or heat input to the weld.

Some disclosed example systems and methods provide a trigger hold feature that enables the operator to set a particular synergic output. When the trigger hold is engaged, the operator may release the trigger (or foot pedal, etc.) while the power supply maintains the synergic output to continue the welding-type operation. In some examples, the trigger hold is engaged after a substantially constant output (e.g., less than a threshold deviation) is sustained for a threshold time period. In some such examples, the trigger hold feature times out and is disable in response to the operator not using the trigger hold function within a threshold time period. For instance, if the operator is unaware that the trigger hold feature is available and ready to be engaged, or if the operator wishes to continue using the synergic output instead of engaging the trigger hold feature, the trigger hold feature times out and release of the trigger is less likely to cause an unintended continuation of welding. Some disclosed example systems and methods output a perceptible alert to inform the operator that the trigger hold may be engaged (e.g., when the input device is released), such as a visual alert, an audible alert, a haptic alert, and/or any other type of perceptible feedback.

Because the input device (e.g., the trigger, foot pedal, or other variable input device) may be difficult for some operators to maintain in a steady position, some disclosed systems and methods filter the input signal used to control the synergic output. In some examples, the filter reduces the influence of short-term or transient changes in the output. Some example systems and methods filter the input signal by applying weights to the input signals, and using multiple, weighted samples of the input signal to determine a filtered input signal, which is then used to determine the synergic output. Recent samples may be weighted lower, with the weight applied to a given sample increasing as the age of the sample increases. The number of most recent samples may be limited to enable the operator to responsively change the synergic output during the weld.

In some disclosed example systems and methods, the range of input signal values (e.g., from a trigger, foot pedal, or other variable input device) is mapped to an entire range of output power of which the welding-type system is capable. In other disclosed example systems and methods, the range of input signal values is mapped to a subrange of synergic output, and/or subranges of variables (e.g., voltage and wire feed speed) involved in generating the synergic output. In some examples, the subrange of synergic output is determined based on one or more physical characteristics of the welding operation, such as workpiece thickness, workpiece material, wire diameter, wire material, and/or shielding gas composition. Additionally or alternatively, subranges of the input signal range are mapped to separate subranges of the synergic output, in which the subranges of the input signal range are not equally wide and/or the subranges of the synergic output are not equally wide.

Some disclosed example systems and methods involve synergically controlling the value of multiple welding-type parameters based on the value of a control signal, such as by looking up the parameters in a lookup table. In other examples, a primary parameter or key parameter (e.g., voltage, current, power, etc.) may be correlated to the control signal, and one or more secondary parameters (e.g., wire feed speed, pulse trim, etc.) are adjusted based on the changes to the primary parameter.

Additionally or alternatively, instead of modifying parameters based on the control signal or a primary parameter, one or more parameters may be controlled via the control signal while the other operative parameters are held constant. Holding parameters constant may enable an operator to, for example, vary a particular parameter of interest according to the conditions of the weld without having multiple adjustments made by the welding-type system in response to the modified parameter.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a welding-type power supply refers to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, a "weld voltage setpoint" refers to a voltage input to the power converter via a user interface, network communication, weld procedure specification, or other selection method.

As used herein, a "circuit" includes any analog and/or digital components, power and/or control elements, such as a microprocessor, digital signal processor (DSP), software, and the like, discrete and/or integrated components, or portions and/or combinations thereof.

As used herein, "synergic control" refers to controlling two or more variables or components according to a specified relationship. In some examples, a primary variable is controlled via an input device, and one or more variables are synergically controlled according to the primary variable. As used herein, "synergic output" refers to welding-type power in which two or more variables associated with generating the welding-type power are controlled according to a specified relationship.

As used herein, the term "remote wire feeder" refers to a wire feeder that is not integrated with the power supply in a single housing.

Disclosed example welding-type power supplies include a power conversion circuit, a communication circuit, and a control circuit. The power conversion circuit converts input power to welding-type power and outputs the welding-type power to a welding-type torch. The communication circuit receives a control signal from a remote control device during a welding-type operation, and the control circuitry synergically controls a voltage of the welding-type power and a wire feed speed based on the control signal.

In some examples, the control circuitry synergically controls the voltage and the wire feed speed by: setting a commanded power level of the welding-type power based on the control signal, determining the voltage and the wire feed speed corresponding to the commanded power level, controlling the power conversion circuit to output the voltage, and controlling a wire feeder based on the wire feed speed. In some such examples, the control circuitry accesses a lookup table to determine the commanded power level of the welding-type power based on the control signal.

In some example welding-type power supplies, the communication circuit receives the control signal from at least one of the welding-type torch or a foot pedal. In some examples, the control circuitry synergically controls the voltage of the welding-type power by changing a deposition mode from a first deposition mode to a second deposition mode in response to the control signal. In some such examples, the first deposition mode is an arcless hotwire mode, a regulated metal deposition mode, a controlled short circuit mode, a short arc mode, a pulse spray mode, or a spray transfer mode, and the second deposition mode is another of the arcless hotwire mode, the regulated metal deposition mode, the controlled short circuit mode, the short arc mode, the pulse spray mode, or the spray transfer mode.

In some example welding-type power supplies, the control circuitry synergically controls the voltage of the welding-type power and the wire feed speed to enable manual control of a heat input to the welding-type operation in real time during the welding-type operation. In some examples, the control circuitry synergically controls the voltage of the welding-type power and the wire feed speed by controlling a remote wire feeder based on the wire feed speed. In some example welding-type power supplies, the control circuitry selects the voltage from a substantially contiguous voltage range and selects the wire feed speed from a substantially contiguous wire feed speed range.

Disclosed example control devices for a welding-type system include an input circuit, a control circuit, and an output circuit. The input circuit identifies a user input during a welding-type operation involving welding-type power. The control circuitry determines a voltage adjustment of the welding-type power and a wire feed speed adjustment based on the user input, and based on a synergic control scheme for a voltage of the welding-type power and a wire feed speed.

The output circuit generates one or more control signals to control a welding-type power supply providing the welding-type power to perform the voltage adjustment and to control a wire feeder to perform the wire feed speed adjustment.

In some example control devices, the control circuitry determines the voltage adjustment and the wire feed speed adjustment based on the synergic control scheme by looking up the voltage adjustment and the wire feed speed adjustment in a lookup table. In some examples, the control circuitry changes a deposition mode from a first deposition mode to a second deposition mode in response to the user input based on at least one of the voltage adjustment or the wire feed speed adjustment. In some such examples, the first deposition mode is an arcless hotwire mode, a regulated metal deposition mode, a controlled short circuit mode, a short arc mode, a pulse spray mode, or a spray transfer mode, and the second deposition mode is another of the arcless hotwire mode, the regulated metal deposition mode, the controlled short circuit mode, the short arc mode, the pulse spray mode, or the spray transfer mode.

In some example control circuits, the output circuit transmits at least one of the one or more control signals to a remote wire feeder to control the remote wire feeder based on the wire feed speed adjustment. In some examples, the output circuit transmits at least one of the one or more control signals to the welding-type power supply to control the welding-type power supply based on the voltage adjustment. In some examples, the control device is a welding-type torch, a foot pedal, the welding-type power supply, or a remote wire feeder.

Disclosed example welding-type power supplies include: power conversion circuitry configured to convert input power to welding-type power and to output the welding-type power to a welding-type torch; communications circuitry configured to receive a control signal from a remote control device during a welding-type operation, wherein the control signal is representative of a value within a first predetermined range of values; and control circuitry. The control circuitry is configured to: determine, based on at least one physical characteristic of a welding operation, a first limit range of a first one of: a voltage of a welding-type power output by the power conversion circuitry, a current of the welding-type power, or a wire feed speed; determine, based on the at least one physical characteristic of the welding operation, a second limit range of a second one of: the voltage of the welding-type power output by the power conversion circuitry, the current of the welding-type power, or the wire feed speed; and map the first limit range and the second limit range to the first predetermined range of values; and synergically control the first one and the second one of the voltage, the current, or the wire feed speed within the first limit range and within the second limit range based on the value of the control signal within the first predetermined range of values.

In some examples, the at least one physical characteristic of the welding operation comprises at least one of a workpiece thickness, a workpiece material type, a wire type, a wire diameter, or a shielding gas type. In some example welding-type power supplies, the control circuitry is configured to synergically control the voltage and the wire feed speed by: setting a commanded power level of the welding-type power based on the control signal; determining the voltage and the wire feed speed corresponding to the commanded power level; controlling the power conversion circuitry to output the voltage; and controlling a wire feeder based on the wire feed speed.

In some example welding-type power supplies, the communications circuitry is configured to receive the control signal from at least one of the welding-type torch or a foot pedal. In some example welding-type power supplies, the control circuitry is configured to control an output to provide at least one of a visual indicator, an audible indicator, or a haptic indicator based on the control signal. In some example welding-type power supplies, the control circuitry is configured to, in response to a control signal hold command, synergically control the voltage of the welding-type power and the wire feed speed based on a hold value of the control signal corresponding to the value of the control signal associated with the control signal hold command.

In some example welding-type power supplies, the control circuitry is configured to filter changes in the control signal that are less than a noise threshold. In some example welding-type power supplies, the control circuitry is configured to determine the at least one physical characteristic of the welding operation based on an input to a user interface or received via the communications circuitry. In some example welding-type power supplies the first limit range is less than an entire voltage range of the power conversion circuitry and the second limit range is less than an entire wire feed speed range of a wire feeder controlled by the control circuitry.

In some example welding-type power supplies, the control circuitry is configured to map the first limit range and the second limit range of the first predetermined range of values of the control signal by: mapping a first end of the first limit range and a first end of the second limit range to a first value in the first predetermined range of values of the control signal; and mapping a second end of the first limit range and a second end of the second limit range a second value in the first predetermined range of values of the control signal. In some examples, the first limit range and the second limit range correspond to values between the first value and the second value.

In some example welding-type power supplies, the control circuitry is configured to look up the first end and the second end of the first limit range and the first end and the second end of the second limit range in a lookup table. In some example welding-type power supplies the control circuitry is configured to synergically control the first one and the second one of the voltage, the current, or the wire feed speed by interpolating between the first end and the second end of the first limit range based on the value of the control signal relative to the first predetermined range of values, and interpolating between the first end and the second end of the second limit range, based on the value of the control signal relative to the first predetermined range of values.

In some example welding-type power supplies, the first value in the first predetermined range of values is a minimum value of the first predetermined range of values. In some example welding-type power supplies, the second value in the first predetermined range of values is a maximum value of the first predetermined range of values.

Turning now to the drawings, FIG. 1 is a block diagram of an example welding system 100 having a welding-type power supply 102, a wire feeder 104, and a welding torch 106. The welding system 100 powers, controls, and supplies consumables to a welding application. The example welding torch 106 is configured for gas metal arc welding (GMAW). In the illustrated example, the power supply 102 is configured to supply power to the wire feeder 104, and the wire feeder 104 may be configured to route the input power to the welding torch 106. In addition to supplying an input power, the wire feeder 104 supplies a filler metal to a welding torch 106 for various welding applications (e.g., GMAW welding, flux core arc welding (FCAW)).

The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes a power conversion circuitry 110, which may include transformers, rectifiers, switches, and so forth, capable of converting the AC input power to AC and/or DC output power as dictated by the demands of the system 100 (e.g., particular welding processes and regimes). The power conversion circuitry 110 converts input power (e.g., the primary power 108) to welding-type power based on a weld voltage setpoint and outputs the welding-type power via a weld circuit.

In some examples, the power conversion circuitry 110 is configured to convert the primary power 108 to both welding-type power and auxiliary power outputs. However, in other examples, the power conversion circuitry 110 is adapted to convert primary power only to a weld power output, and a separate auxiliary converter is provided to convert primary power to auxiliary power. In some other examples, the power supply 102 receives a converted auxiliary power output directly from a wall outlet. Any suitable power conversion system or mechanism may be employed by the power supply 102 to generate and supply both weld and auxiliary power.

The power supply 102 includes a control circuitry 112 to control the operation of the power supply 102. The power supply 102 also includes a user interface 114. The control circuitry 112 receives input from the user interface 114, through which a user may choose a process and/or input desired parameters (e.g., voltages, currents, particular pulsed or non-pulsed welding regimes, and so forth). The user interface 114 may receive inputs using any input device, such as via a keypad, keyboard, buttons, touch screen, voice activation system, wireless device, etc. Furthermore, the control circuitry 112 controls operating parameters based on input by the user as well as based on other current operating parameters. Specifically, the user interface 114 may include a display 116 for presenting, showing, or indicating, information to an operator. The control circuitry 112 may also include interface circuitry for communicating data to other devices in the system 100, such as the wire feeder 104. For example, in some situations, the power supply 102 wirelessly communicates with the wire feeder 104 and/or other welding devices within the welding system 100. Further, in some situations, the power supply 102 communicates with the wire feeder 104 and/or other welding devices using a wired connection, such as by using a network interface controller (NIC) to communicate data via a network (e.g., ETHERNET, 10BASE2, 10BASE-T, 100BASE-TX, etc.).

The control circuitry 112 includes at least one processor 120 that controls the operations of the power supply 102. The control circuitry 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device and/or logic circuit. For example, the processor 120 may include one or more digital signal processors (DSPs).

The example control circuitry 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding current data, detect short circuit parameters, determine amount of spatter) during operation.

In some examples, the welding power flows from the power conversion circuitry 110 through a weld cable 126 to the wire feeder 104 and the welding torch 106. The example weld cable 126 is attachable and detachable from weld studs at each of the power supply 102 and the wire feeder 104 (e.g., to enable ease of replacement of the weld cable 126 in case of wear or damage).

The example communications transceiver 118 includes a receiver circuit 121 and a transmitter circuit 122. Generally, the receiver circuit 121 receives data transmitted by the wire feeder 104 and the transmitter circuit 122 transmits data to the wire feeder 104. The example wire feeder 104 also includes a communications transceiver 119, which may be similar or identical in construction and/or function as the communications transceiver 118.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 112 to enable, inhibit, or control gas flow (e.g., shielding gas) through the valve 130. Shielding gas exits the valve 130 and flows through a gas conduit 132 (which in some implementations may be packaged with the welding power output) to the wire feeder 104 which provides the shielding gas to the welding application. In some examples, the welding system 100 does not include the gas supply 128, the valve 130, and/or the gas conduit 132. In some other examples, the valve 130 is located in the wire feeder 104, and, the gas supply 128 is connected to the wire feeder 104.

In some examples, the wire feeder 104 uses the welding power to power the various components in the wire feeder 104, such as to power wire feeder control circuitry 134. As noted above, the weld cable 126 may be configured to provide or supply the welding power. The wire feeder control circuitry 134 controls the operations of the wire feeder 104. In some examples, the wire feeder 104 uses the wire feeder control circuitry 134 to detect whether the wire feeder 104 is in communication with the power supply 102 and to detect a current welding process of the power supply 102 if the wire feeder 104 is in communication with the power supply 102.

A contactor 135 (e.g., high amperage relay) is controlled by the wire feeder control circuitry 134 and configured to enable or inhibit welding power to continue to flow to the weld cable 126 for the welding application. In some examples, the contactor 135 is an electromechanical device. However, the contactor 135 may be any other suitable device, such as a solid state device, and/or may be omitted entirely and the weld cable 126 is directly connected to the output to the welding torch 106. The wire feeder 104 includes a wire drive 136 that receives control signals from the wire feeder control circuitry 134 to drive rollers 138 that rotate to pull wire off a spool 140 of wire. The wire drive 136 feeds electrode wire to the welding torch 106. The wire is provided to the welding application through a torch cable 142. Likewise, the wire feeder 104 may provide the shielding gas from the gas conduit 132 and combined in a torch cable 144. The electrode wire, the shield gas, and the power from the weld cable 126 are bundled together in a single torch cable 144 and/or individually provided to the welding torch 106.

The welding torch 106 delivers the wire, welding power, and/or shielding gas for a welding application. The welding torch 106 is used to establish a welding arc between the welding torch 106 and a workpiece 146. A work cable 148 couples the workpiece 146 to the power supply 102 (e.g., to the power conversion circuitry 110) to provide a return path for the weld current (e.g., as part of the weld circuit). The example work cable 148 is attachable and/or detachable from the power supply 102 for ease of replacement of the work cable 148. The work cable 148 may be terminated with a clamp 150 (or another power connecting device), which couples the power supply 102 to the workpiece 146.

A communication cable 154 connected between the power supply 102 and the wire feeder 104, which enables bidirectional communication between the transceivers 118, 119. The communications transceivers 118 and 119 may communicate via the communication cable 154, via the weld circuit, via wireless communications, and/or any other communication medium. Examples of such communications include weld cable voltage measured at a device that is remote from the power supply 102 (e.g., the wire feeder 104).

The example torch 106 includes a power selector circuit 156 to permit the user of the torch (e.g., the welder) to make adjustments to the welding output from the torch in a synergic manner. For example, as the user makes adjustments via the power selector circuit 156, the power supply 102 and the wire feeder 104 synergically change the output voltage and the wire feed speed of the weld. An example implementation of the power selector circuit 156 is a pressure-sensitive trigger. For instance, the torch 106 may include the same trigger used in conventional welding-type torches, modified to provide an analog signal or encoded digital signal to represent an amount of input to the trigger. In some examples, the operator may incrementally depress the trigger (e.g., apply more pressure) to synergically increase the voltage and wire feed speed and/or incrementally release the trigger (e.g., apply less pressure) to synergically decrease the voltage and wire feed speed. Alternative implementations of the power selector circuit 156 include a wheel or slide configured to control a potentiometer and positioned to enable an operator to manipulate the input while welding (e.g., while simultaneously holding the trigger).

The power selector circuit 156 outputs a control signal 158 to a power control circuit 160 of the wire feeder 104. The control signal 158 may be an analog or digital signal that represents the output from the power selector circuit 156. The example power control circuit 160 may be implemented using the control circuitry 134 and/or as a separate circuit. The power control circuit 160 identifies a user input (e.g., an input from the power selector circuit 156) during a welding-type operation involving welding-type power. The power control circuit 160 determines, based on the user input, a voltage adjustment for the welding-type power and a wire feed speed adjustment. For example, the power control circuit 160 may reference a synergic control scheme, such as an algorithm or a lookup table, to determine a voltage setpoint and/or a wire feed speed setpoint corresponding to the user input. A lookup table may be stored in, for example, the storage device(s) 123 and/or the memory 124 of the control circuitry 134.

The example power control circuit 160 generates one or more control signals to control the welding-type power supply 102 to perform a voltage adjustment and to control the wire feeder 104 to perform a wire feed speed adjustment. For example, the power control circuit 160 may provide a wire feed speed command to the control circuitry 134 to control the wire feed speed of the wire drive 136, and/or transmit a control signal to the power supply 102 via the communications transceiver 119 and the communication cable 154 to control the output voltage of the power supply 102.

In some examples, the synergic control of the voltage and the wire feed speed causes the power control circuit 160 to change a deposition mode in response to the user input via the power selector circuit 156. For example, GMAW deposition modes, such as an arcless hotwire mode, a regulated metal deposition mode, a controlled short circuit mode, a short arc mode, a pulse spray mode, or a spray transfer mode, typically correspond to different voltage ranges (with some overlap between some modes).

In some examples, the control circuitry 112 implements a trigger hold feature that enables the operator to set a particular synergic output. When the trigger hold is engaged, the operator may release the power selector 156 (e.g., resulting in a normalized value of the control signal falling to less than a threshold value associated with outputting welding-type power), and the control circuitry 112 continues to maintain the synergic output using a hold value of the control signal 158. In some examples, the trigger hold is engaged after a substantially constant output (e.g., less than a threshold deviation) is sustained for a threshold time period. Additionally or alternatively, the torch 106, the wire feeder 104, and/or any other device may include an input device (e.g., a button, switch, etc.) that provides a control signal hold command to the control circuitry 112. When the trigger hold is engaged, such as the operator releasing the power selector 156, the control circuitry 112 determines the appropriate synergic output and controls the power conversion circuitry 110 and the wire feeder 104 based on the hold value determined in association with the control signal hold command. For example, the hold value may be determined using a value at which the operator held the power selector 156 for a threshold period of time to generate the control signal hold command, and/or a value of the control signal 158 at the time the control signal hold command was generated.

The control circuitry 112 may cause the trigger hold feature to time out, and disable the trigger hold feature, in response to the operator not using the trigger hold function within a threshold time period. For example, if the operator is unaware that the trigger hold feature is available or ready to be engaged, the operator may not intend to continue the welding-type operation in response to releasing the trigger of the welding torch 106. In other cases, the operator may not desire to use the trigger hold, and instead prefers to continue using (e.g., varying) the synergic output during the welding-type operation.

In some examples, the control circuitry 112 responds to the control signal hold command by outputting a perceptible alert to inform the operator that the trigger hold may be engaged (e.g., when the power selector 156 is released). Example alerts may include a visual alert, an audible alert, a haptic alert, and/or any other type of perceptible feedback. Example trigger hold feedback may include, for example, an audible signal (e.g., a beep, tone, audible message, and/or any other audible feedback via a speaker in the power supply 102, the wire feeder 104, the torch 106, a helmet of the operator, and/or any other speaker), a visual signal (e.g., a light, LED, display, and/or any other visual feedback via the power supply 102, the wire feeder 104, the torch 106, a helmet of the operator, and/or any other visual device), haptic feedback (e.g., a tactile or other haptic feedback at the torch 106 or other location which can be perceived by the operator), and/or any other form of feedback. The trigger hold feedback signal conveys to the operator that the trigger hold function is engaged at the present synergic output level, should the operator choose to use the trigger hold function (e.g., by releasing the trigger or other variable input device). In some examples, the torch 106 includes a vibration motor to create haptic feedback to the operator, and the control circuitry is configured to output a haptic feedback signal to control the vibration motor, an eccentric rotating mass actuator, a piezoelectric actuator, and/or any other haptic generator, in response to the control signal hold command.

The example control circuitry 112 may also filter the control signal 158 to avoid unintended changes in the synergic output caused by difficulty in maintaining the power selector 156 in a steady position. For example, the control circuitry 112 may filter the control signal 158 to reduce the influence of short-term or transient changes in the synergic output. An example filter technique may involve determining the synergic output using a set of most recent samples of the control signal 158, and applying weights to the samples of the control signal 158 based on the age of the samples. Thus, older samples are more heavily weighted in the determination of the synergic output than the more recent samples. In some such examples, the weights may have a rapid increase after a threshold age of the samples, such that samples measured less than a threshold time prior are weighted very low and samples measured more than the threshold time prior are weighted substantially higher.

Another example technique that may be used involves determining a filtering subrange of values of the control signal 158 based on the value of the control signal 158 at a given time. While the value of the control signal 158 at subsequent times remains within the filtering subrange of values, the control circuitry 112 synergically controls the voltage of the welding-type power and the wire feed speed based on the value of the control signal 158 used to determine the filtering subrange.

In some examples, the control circuitry 112 maps the range of values of the control signal 158, or a subrange of the values, to an entire range of output power of which the welding-type system 100 is capable. In other examples, the range of values of the control signal 158 is mapped to a subrange of the synergic output and/or subranges of variables (e.g., voltage and wire feed speed) involved in generating the synergic output. For example, the control circuitry 112 may determine a recommended range and/or a permissible range of synergic output based on the physical characteristics of the welding-type operation, which may be input via the user interface 114, and map the recommended range and/or a permissible range of synergic output to the range of values of the control signal such that the synergic output cannot go outside of the mapped subrange of the synergic output. Example physical characteristics that may be used to determine the subrange of synergic output may include a workpiece thickness, a workpiece material, a wire composition, a wire diameter, and/or a shielding gas composition. By mapping the range of values of the control signal 158 to a subrange that is determined to be recommended or permissible for the physical characteristics of the welding-type operation, the operator may be prevented from using a synergic output that is not recommended for the particular physical characteristics of the weld, thereby improving weld quality and reducing errors and/or rework.

Additionally or alternatively, the control circuitry 112 may map subranges of the control signal 158 to separate subranges of synergic output, in which the subranges of the control signal 158 are not equally wide and/or the subranges of the synergic output are not equally wide. In this manner, the control circuitry 112 may enable an operator to have a higher degree of control of the synergic output in a portion of interest of the range of the power selector 156 (e.g., a portion of the travel range of a trigger or foot pedal) than in another portion.

Figure 2:
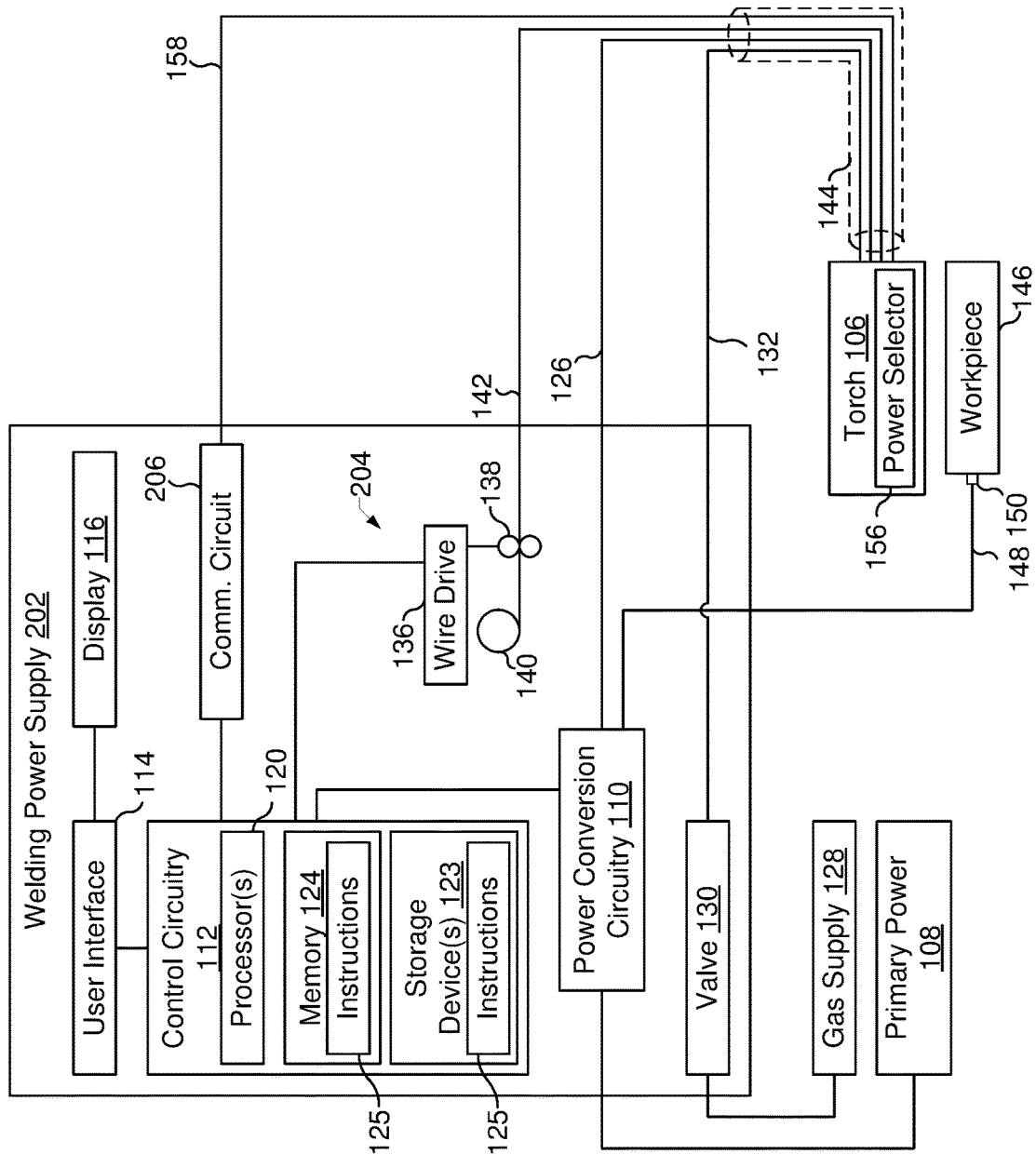
FIG. 2 is a block diagram of another example welding-type system configured to provide synergic power control with a welding-type power supply having an integrated wire feeder, in accordance with aspects of this disclosure.

FIG. 2 is a block diagram of another example welding-type system 200 configured to provide synergic power control with a welding-type power supply 202 having an integrated wire feeder 204. The example welding-type power supply 202 includes the power conversion circuitry 110, control circuitry 112, the user interface 114, the display 116, the processor(s) 120, the storage devices(s) 123, the memory 124, the instructions 125, and the valve 130 of the example power supply 102 of FIG. 1.

In contrast with the example system 100, in the example of FIG. 2 the power supply 202 includes the integrated wire feeder 204 instead being connected to a remote wire feeder. The power supply 202 of FIG. 2 outputs welding-type power and electrode wire to the torch 106, which includes the example power selector circuit 156.

The integrated wire feeder 204 includes the wire drive 136, the drive rollers 138, and the wire spool 140, and feeds the wire through a torch cable 142 to the torch 106.

The example welding-type power supply 202 includes a communication circuit 206 to receive the control signal 158 from the power selector circuit 156 (e.g., during a welding operation). In some examples, the communication circuit 206 converts an analog signal to a digital signal for use by the control circuitry 112 and/or receives a digital signal from the power selector circuit 156. The example control circuitry 112 synergically controls the voltage of the welding-type power (e.g., by controlling the power conversion circuitry 110) and the wire feed speed (e.g., by controlling the wire drive 136) based on the control signal 158. In this manner, the example control circuitry 112 may operate in a similar manner as the power control circuit 160 of FIG. 1.

The control circuitry 112 may reference a synergic control scheme, such as an algorithm or a lookup table, to determine a voltage setpoint and/or a wire feed speed setpoint corresponding to the user input. A lookup table may be stored in, for example, the storage device(s) 123 and/or the memory 124 of the control circuitry 112.

Figure 3:
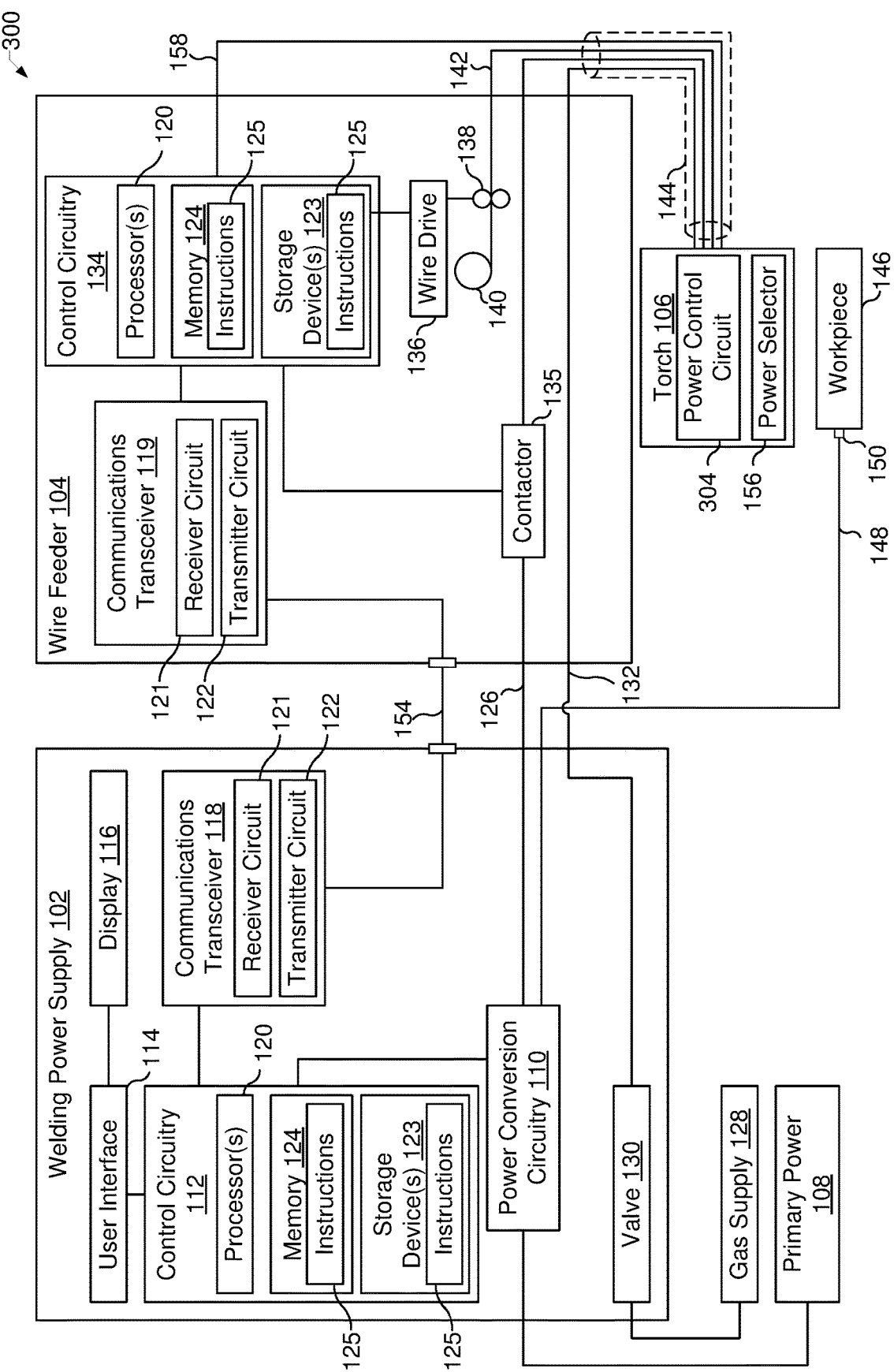
FIG. 3 is a block diagram of another example welding-type system including a power control circuit configured to provide synergic power control, in accordance with aspects of this disclosure.

FIG. 3 is a block diagram of another example welding-type system 300 including a torch 302 having a power control circuit 304 configured to provide synergic power control. The example power control circuit 304 in the torch 106 may be implemented in a similar manner as the power control circuit 160 described above with reference to FIG. 1.

Figures 4, 5A, 5B:
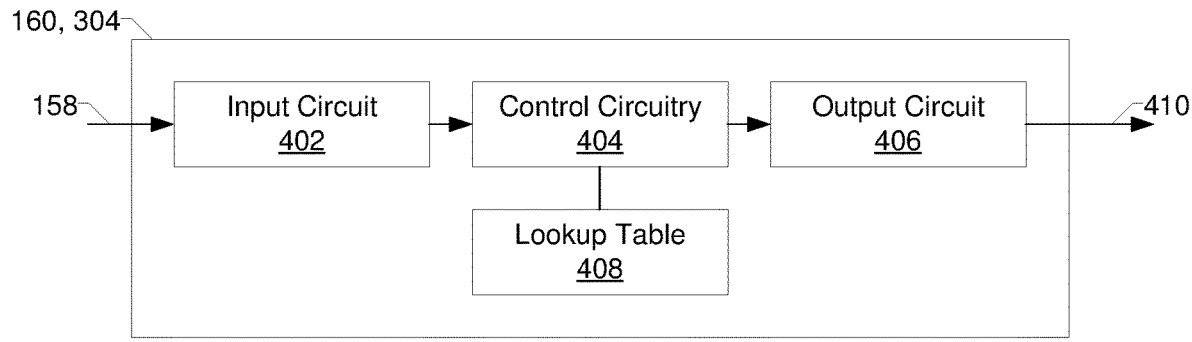
FIG. 4 is a block diagram of an example implementation of the power control circuit of FIG. 3.
FIG. 5A is an example table including corresponding voltage, wire feed speed, and process modes that may be used to determine voltage setpoints, wire feed speed setpoints, and/or process modes for performing welding operations.
FIG. 5B is another example table including schedules and corresponding weld parameters for performing welding operations.

FIG. 4 is a block diagram of an example implementation of the power control circuit 160, 304 of FIGS. 1 and 3. The power control circuit 160, 304 of FIG. 4 may be implemented, for example, in the torch 106, the remote wire feeder 104, a foot pedal, the power supply 102, and/or any other component of the systems 100, 200, 300 of FIGS. 1-3.

The example power control circuit 160, 304 of FIG. 4 includes an input circuit 402, a control circuitry 404, and an output circuit 406. The input circuit 402 identifies a user input during a welding-type operation involving welding-type power. For example, the input circuit 402 may receive the control signal 158 from the power selector circuit 156 when an operator controls the power selector circuit 156 during a weld to synergically adjust the welding output.

The control circuitry 404 determines a voltage adjustment of the welding-type power and a wire feed speed adjustment based on the user input (e.g., based on the control signal 158). For example, the control circuitry 404 may determine the voltage adjustment and the wire feed speed adjustment by interpreting the user input according to a synergic control scheme relating the voltage of the welding-type power and the wire feed speed output by the torch 106. In the example of FIG. 4, the control circuitry 404 may look up the voltage adjustment and the wire feed speed adjustment in a lookup table based on the control signal 158.

In some examples, the control circuitry 404 identifies or determines that the deposition mode is to be changed (e.g., from a first deposition mode to a second deposition mode) in response to the user input. For example, as the synergic control scheme causes the voltage to increase or decrease, a threshold may be crossed that causes the control circuitry 404 to determine (e.g., based the voltage adjustment, the wire feed speed adjustment, the lookup table 408, and/or any other synergic control factors) that the output power is more appropriately suited to a different deposition mode or transfer mode. Example deposition modes that may be selected by the control circuitry 404 include an arcless hotwire mode, a regulated metal deposition mode, a controlled short circuit mode, a short arc mode, a pulse spray mode, or a spray transfer mode. In some examples, the control circuitry 404 may apply a hysteresis to the thresholds so that the control circuitry 404 does not repeatedly switch between deposition modes having similar or overlapping voltage and/or wire feed speed ranges.

The output circuit 406 generates one or more control signals 410 to control the power supply 102 providing the welding-type power (e.g., to the torch 106) to perform the voltage adjustment, and/or to control the wire feeder 104 to perform the wire feed speed adjustment. In some examples, the one or more control signals 410 are transmitted to different devices (e.g., the power supply 102 and the remote wire feeder 104). In some other examples, the one or more control signals 410 are transmitted to a single device (e.g., from the power supply 102 to the remote wire feeder 104, from the remote wire feeder 104 to the power supply 102, from the torch 106 to the power supply 202 including the integrated wire feeder 204, etc.).

FIG. 5A is an example table 500 including corresponding voltage, wire feed speed, and process modes that may be used to determine voltage setpoints, wire feed speed setpoints, and/or process modes for performing welding operations. The example table 500 may be used to implement the lookup table 408 of FIG. 4. While one example table 500 is shown in FIG. 5A, the lookup table 408 may include multiple tables corresponding to different welding conditions (e.g., different workpiece materials, different wire types, different gas types, etc.). The synergic control scheme represented in the lookup table 408 enables the operator to adjust the welding output to react to changes in welding conditions, such as changes in workpiece thickness and/or seam orientation.

The example lookup table 500 of FIG. 5A correlates different input values (e.g., values represented by the control signal 158) with corresponding voltages (e.g., arc voltage setpoints), wire feed speeds, and/or deposition modes. For example, as an operator increases a value of the control signal 158 and/or decreases the value of the control signal 158 during a welding-type operation. (e.g., by incrementally depressing and/or releasing the trigger, by increasing and/or decreasing a control device that is operatively linked to a potentiometer, etc.), the control circuitry 404 of FIG. 4 may look up incrementally increasing and/or decreasing input values in the table 500 to determine the corresponding output voltage, wire feed speed, and/or deposition mode. In some examples, the corresponding voltages, wire feed speeds, and/or deposition modes are empirically determined and populated into the table 500 prior to the welding operations (e.g., during manufacture, downloading a firmware update, downloading a software package, etc.).

FIG. 5B is another example table 502 including schedules and corresponding weld parameters for performing welding operations. The example table 502 may be used to implement the lookup table 408 of FIG. 4 instead of or in addition to the table 500. In the example table 502, different ranges of input values correspond to different schedules, and each schedule may be assigned different variables. When the control circuitry 112 receives the control signal 158, the control circuitry 112 looks up the schedule corresponding to the value of the control signal 158 as the input value, and controls the power conversion circuitry 110 according to the parameters specified in the table 502 in association with the schedule. The parameters and/or the input values associated with the schedules may be set by the operator. Using the example table 502, the operator may switch between pre-configured schedules during a welding-type operation by controlling the control signal 158 via the power selector 156 (e.g., based on an amount of depression of a trigger, foot pedal, or other variable input device).

Figure 6:
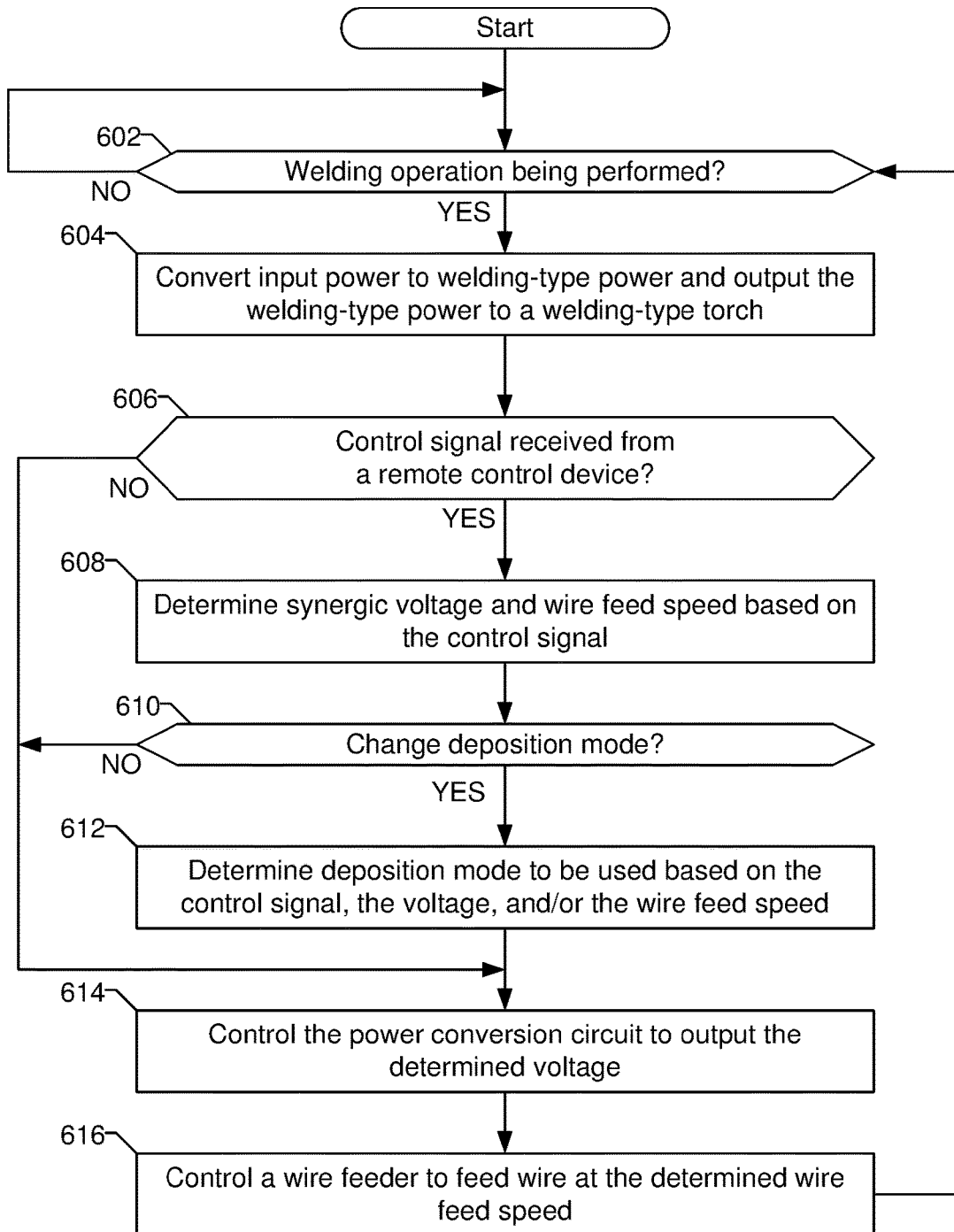
FIG. 6 is a flowchart representative of example machine readable instructions which may be executed by the welding-type system of FIGS. 1, 2, and/or 3 to synergically control a welding system based on input received during a welding operation.

FIG. 6 is a flowchart representative of example machine readable instructions 600 which may be executed to implement one or more disclosed example methods and/or apparatus. The example instructions 600 may be executed by the example control circuitry 112, the example control circuitry 134, and/or the example power control circuit 160, 304 of FIGS. 1-4 to synergically control a welding-type output during a welding-type operation. The example instructions 600 are described with reference to the example welding-type power supply 202 of FIG. 2, but may be modified for execution by the power control circuit 160, 304 of FIGS. 1, 3, and/or 4.

At block 602, the example control circuitry 112 determines whether a welding operation is being performed. If a welding operation is not being performed (block 602), the control circuitry 404 iterates block 602 until welding is occurring. When the control circuitry 112 determines that welding is occurring (block 602), at block 604 the power conversion circuitry 110 converts input power to welding-type power and outputs the welding-type power to the welding torch 106.

At block 606, the communications circuit 206 determines whether a control signal (e.g., the control signal 158) is received from a remote control device (e.g., from the power selector circuit 156). If the control signal 158 has been received from the remote control device (block 606), at block 608 the control circuitry 112 determines the synergic voltage and the wire feed speed based on the control signal 158.

At block 610, the control circuitry 112 determines whether a change in deposition mode is required (e.g., based on the synergic control scheme used to determine the synergic voltage and the wire feed speed). If a change in deposition mode is required (block 610), at block 612 the control circuitry 112 determines a deposition mode to be used based on the control signal, the voltage, and/or the wire feed speed.

After determining the deposition mode (block 612), if no change in the deposition mode is to occur (block 610), or if no control signal has been received (block 606), at block 614 the control circuitry 112 controls the power conversion circuitry 110 to output the determined voltage (e.g., via direct control and/or via a transceiver circuit).

At block 616, the control circuitry 112 controls a wire feeder (e.g., the integrated wire feeder 204, the remote wire feeder 104) to feed wire at the determined wire feed speed (e.g., via direct control and/or via a transceiver circuit).

After controlling the power conversion circuitry 110 and/or the wire feeder 104, 204, control returns to block 602.

Figure 7A:
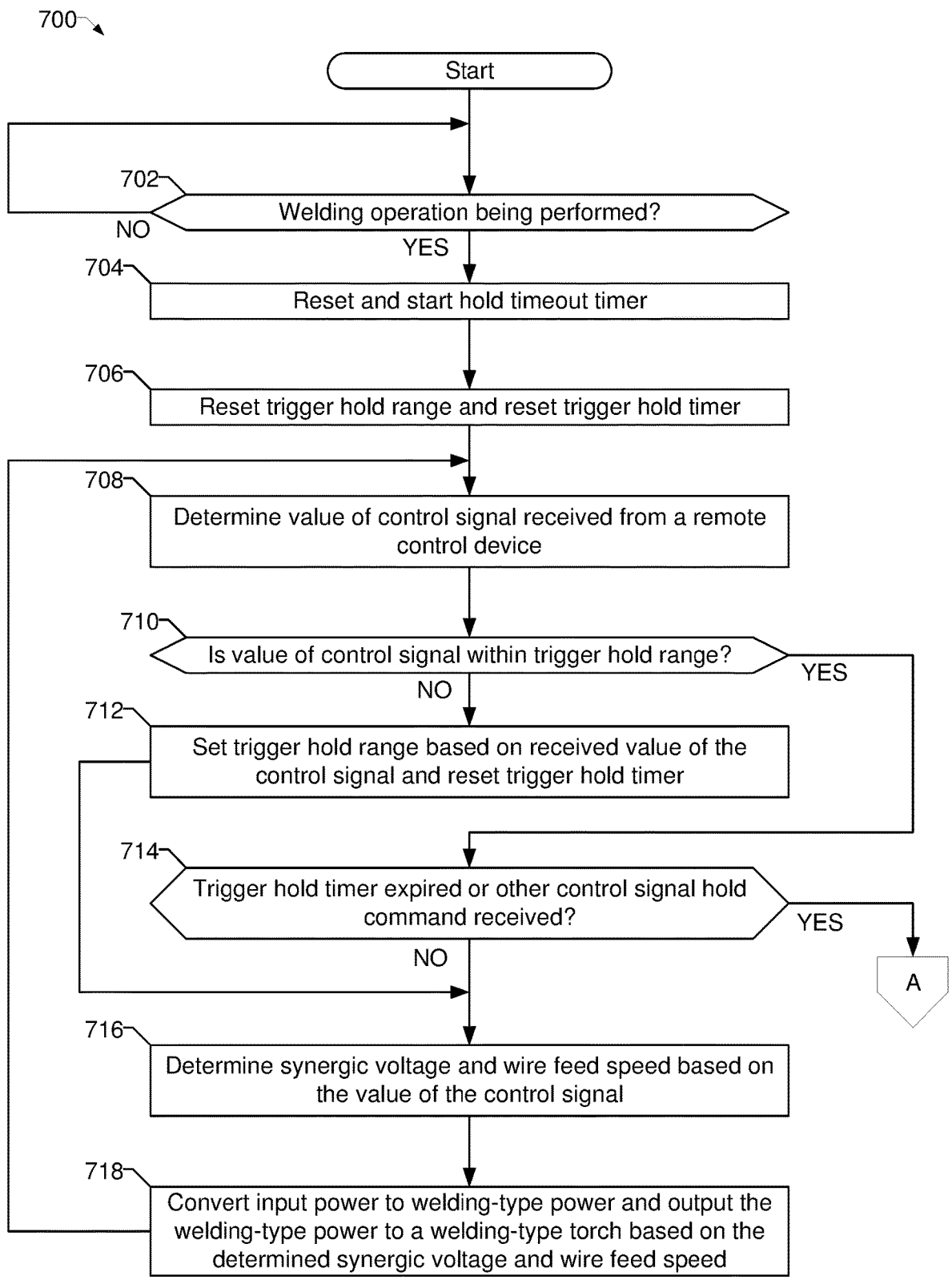
FIGS. 7A and 7B show a flowchart representative of example machine readable instructions which may be executed by the welding-type system of FIGS. 1, 2, and/or 3 to set a hold value of a control signal and to synergically control the welding-type system based on the hold value.
Figure 7B:
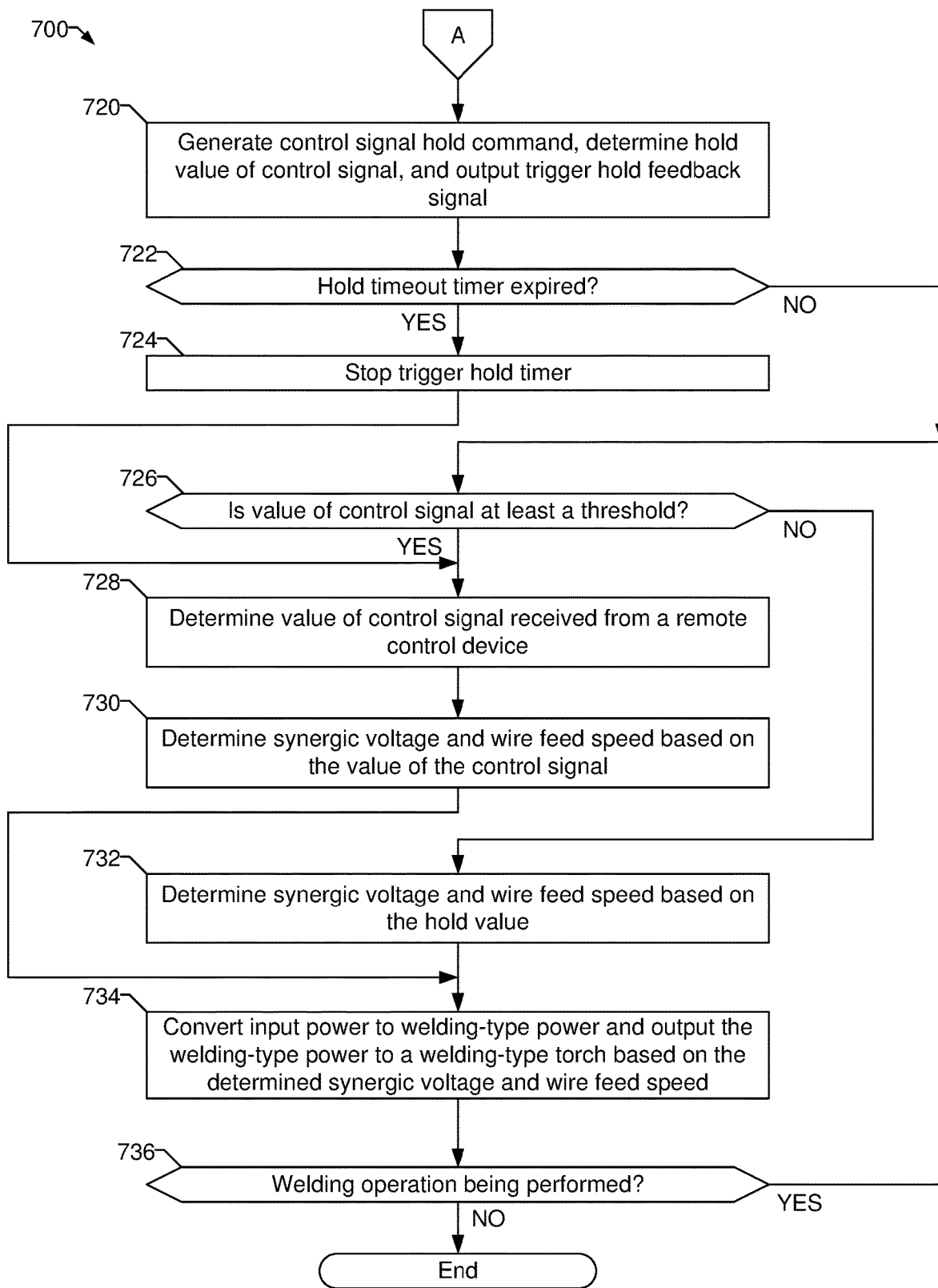

FIGS. 7A and 7B show a flowchart representative of example machine readable instructions 700 which may be executed by the welding-type system 100, 200, 300 of FIGS. 1, 2, and/or 3 to set a hold value of a control signal (e.g., a signal received from a power selector 156) and to synergically control the welding-type system 100, 200, 300 based on the hold value. The example instructions 700 will be described below with reference to the system 100 of FIG. 1, and begin while a welding operation is not occurring.

The example instructions 700 may be performed to, for example, enable a weld operator to set a desired synergic output value (e.g., a synergically controlled power output, and/or a synergically controlled voltage and wire feed speed) and then continue to output the synergic output value while relieving the operator from maintaining a precise control signal value (e.g., a constant torch trigger position). Thus, the example instructions 700 may reduce fatigue on an operator.

At block 702, the control circuitry 112 (e.g., via the processor(s) 120) determines whether a welding operation is being performed. For example, the control circuitry 112 may determine whether at least a threshold value of the control signal is received from a trigger of the welding torch 106 (e.g., the power selector 156), a foot pedal, and/or other control input. If a welding operation is not being performed (block 702), control returns to block 702 to await a welding operation.

If a welding operation is being performed (block 702), at block 704 the control circuitry 112 resets and starts a hold timeout timer. The hold timeout timer may be used to disable use of a hold value. For example, the operator may be unaware that the system can provide a "trigger hold" function and/or the operator does not wish to use a hold value for a given welding operation. When the hold timeout timer expires, the example control circuitry 112 may disable the hold value and use the input value of the control signal for the remainder of the weld operation.

At block 706, the control circuitry 112 resets a trigger hold range and resets a trigger hold timer. The trigger hold range is a range of values of the control signal which, while the value of the control signal remains within the trigger hold range, the control circuitry 112 runs the trigger hold timer to determine whether to set a hold value. The trigger hold range may be set and/or updated to be a range around a received value of the control signal to enable the control circuitry 112 to detect whether the operator is maintaining the input device at a substantially constant level, in which case the trigger hold may be useful to the operator. A larger trigger hold range may make it easier for the operator to set the trigger hold range, but the operator will have to move the input device more to change the output value. Conversely, a smaller trigger hold range may require more precision from the operator on the input device to engage the trigger hold, but will enable the operator to more closely control the level at which the trigger hold is set.

At an expiration of the trigger hold timer, the control circuitry 112 sets the hold value of the control signal and uses the hold value instead of the input value received from the power selector 156. However, as mentioned above, the trigger hold may be disabled if the received value of the control signal remains above a threshold or within a range for a duration of the hold timeout timer.

At block 708, the control circuitry 112 determines a value of a control signal (e.g., the control signal 158) received from a remote control device (e.g., from the power selector circuit 156). For example, the control circuitry 112 may determine a value of the control signal that is proportional to a level that an operator depresses a trigger of the torch 106, depresses a foot pedal, or otherwise controls an input value within a range of input values. The example range of values of the control signal may be represented by, for example, a normalized range of 0 to 100%, in which 0 is the level at which the trigger is completely released and 100% is the level at which the trigger is fully depressed. The range of values of the control signal may be based on the type of analog or digital input device used to generate the control signal. In some examples, a portion of the normalized range corresponds to a nominal or default voltage, wire feed speed, and/or power level (e.g., a setpoint voltage, a setpoint wire feed speed, a setpoint synergic control value, a setpoint power, etc.), at least prior to a trigger hold being activated as described below.

At block 710, the control circuitry 112 determines whether the value of the control signal is within the trigger hold range. For example, the control circuitry 112 may monitor whether the operator is maintaining the input device (e.g., the trigger) at a substantially constant value. If the value of the control signal is not within the trigger hold range (block 710), at block 712 the control circuitry 112 sets the trigger hold range based on the received value of the control signal and resets the trigger hold timer. For example, if the operator changes the value of the control signal, the control circuitry 112 sets a new trigger hold range based on the updated value of the control signal to enable the control circuitry 112 to determine whether the operator holds the input device at the changed signal value.

On the other hand, if the value of the control signal is within the trigger hold range (block 710), at block 714 the control circuitry 112 determines whether the trigger hold timer has expired, or whether another control signal hold command has been received. Other example control signal hold commands may include a designated input device that enables the operator to engage the trigger hold function, such as a button or switch on the torch 106. Additionally or alternatively, the example control circuitry 112 may generate a control signal hold command in response to expiration of the trigger hold timer.

If the trigger hold timer has not expired and no other control signal hold command has been received (block 714), or after setting the trigger hold range based on the received value of the control signal (block 712), at block 716 the control circuitry 112 determines a synergic voltage and wire feed speed based on the received value of the control signal. For example, the control circuitry 112 may determine a power level corresponding to the received value of the control signal, and calculate or look up (e.g., in a look up table) voltage and wire feed speed parameters corresponding to the power level.

At block 718, the control circuitry 112 controls the power conversion circuitry 110 to convert the input power to welding-type power and outputs the welding-type power to the torch 106 based on the determined voltage and wire feed speed. For example, the control circuitry 112 may control the power conversion circuitry 110 based on the determined voltage and control the wire drive 136 based on the determined wire feed speed. After converting the input power to the welding-type power and outputting the welding-type power (block 718), control returns to block 708 to determine an updated value of the control signal. As the operator changes the value of the control signal (e.g., by adjusting the amount that the trigger is depressed or other input device is adjusted), the control circuitry 112 adjusts the synergic voltage and wire feed speed as the value of the control signal is adjusted.

Turning to FIG. 7B, in response to expiration of the trigger hold timer or other control signal hold command (e.g., the operator maintains the input device in a substantially constant position, a control signal hold command input is received from an input device, etc.) (block 714), at block 720 the control circuitry 112 generates a control signal hold command, determines a hold value of the control signal, and outputs a trigger hold feedback signal. For example, the control circuitry 112 may use the same value of the control signal that was used to determine the trigger hold range as the hold value.

The example trigger hold feedback signal may be, for example, an audible signal (e.g., a beep, tone, audible message, and/or any other audible feedback via a speaker in the power supply 102, the wire feeder 104, the torch 106, a helmet of the operator, and/or any other speaker), a visual signal (e.g., a light, LED, display, and/or any other visual feedback via the power supply 102, the wire feeder 104, the torch 106, a helmet of the operator, and/or any other visual device), haptic feedback (e.g., a tactile or other haptic feedback at the torch 106 or other location which can be perceived by the operator), and/or any other form of feedback. The trigger hold feedback signal conveys to the operator that the trigger hold function is engaged at the present synergic output level, should the operator choose to use the trigger hold function (e.g., by releasing the trigger or other variable input device).

At block 722, the control circuitry 112 determines whether a hold timeout timer has expired. For example, if the hold timeout timer expires, the operator has continued to depress the trigger for a period of time after the control circuitry 112 determines that the trigger hold timer has expired. For example, if the trigger hold timer is set for 5 seconds and the hold timeout timer is set for 10 seconds, if the operator holds the input device for 10 seconds (and/or 5 seconds after the trigger hold timer expires), the control circuitry 112 disables or removes the hold value and performs synergic control based on the received values of the control signal. In some examples, the hold timeout may be configured to disable the trigger hold if the operator holds the trigger value for at least a certain amount of time without the trigger hold criteria occurring.

If the hold timeout timer has not expired (block 722), at block 724 the control circuitry 112 stops the trigger hold timer. As a result, the control circuitry 112 effectively disables the trigger hold for the remainder of the welding-type operation.

If the hold timeout timer has not expired (block 722), at block 726 the control circuitry 112 determines whether the value of the hold signal is at least a threshold value. For example, the control circuitry 112 may monitor to determine whether the operator has released the input device such that the operator is using the trigger hold value for synergic control.

After stopping the trigger hold timer (e.g., the trigger hold is disabled) (block 724), or if the value of the control signal is at least the threshold (e.g., the operator is continuing to hold the trigger) (block 726), at block 728 the control circuitry 112 determines a value of the control signal received from the remote control device (e.g., the power selector 156). Block 728 may be similar or identical to block 708 described above.

At block 730, the control circuitry 112 determines a synergic voltage and wire feed speed based on the value of the control signal. Block 730 may be similar or identical to block 716 described above.

If the value of the control signal is less than the threshold (e.g., the operator has accepted the trigger hold and released the trigger) (block 726), at block 732 the control circuitry 112 determines a synergic voltage and wire feed speed based on the hold value. Thus, the control circuitry 112 may ignore the received value of the control signal while the received value is less than a threshold.

After determining the synergic voltage and wire feed speed based on the hold value (block 732), or based on the value of the control signal (block 730), at block 734 the control circuitry 112 converts the input power to welding-type power and outputs the welding-type power to the welding torch 106 based on the determined synergic voltage and wire feed speed. Block 734 may be similar or identical to block 718 described above.

At block 736, the control circuitry 112 determines whether the welding operation is still being performed. For example, the control circuitry 112 may determine that the welding operation is still being performed if the input signal remains below the threshold, or may determine that the welding operation is no longer being performed if the value of the control signal has increased above the threshold (e.g., the operator has re-engaged the input device and then released the input device to halt the welding operation). If the welding operation is still being performed (block 736), control returns to block 726.

When the welding operation is no longer being performed (block 736), the example instructions end.

Figure 8:
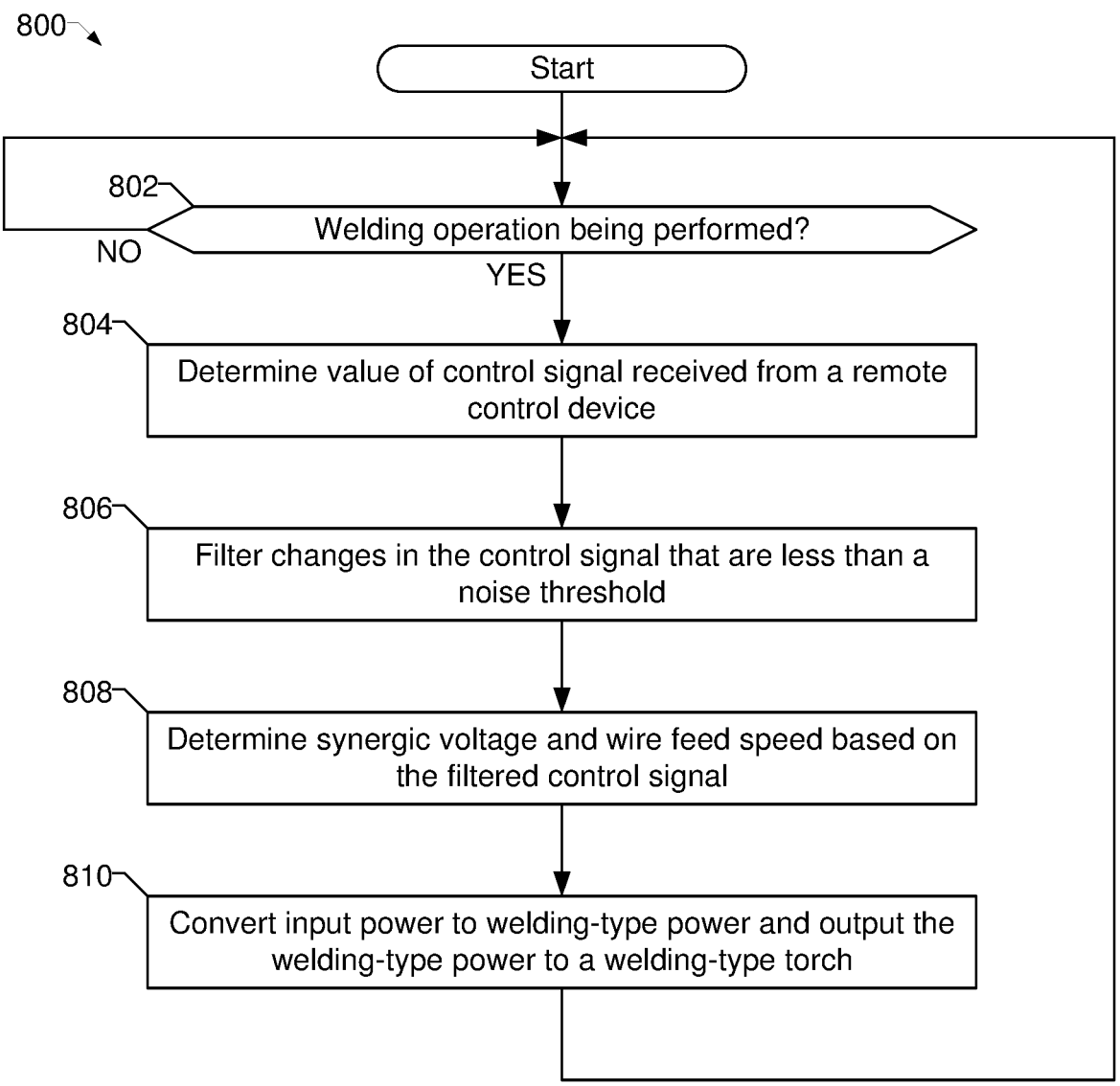
FIG. 8 is a flowchart representative of example machine readable instructions which may be executed by the welding-type system of FIGS. 1, 2, and/or 3 to synergically control the welding-type system based on an control signal and to filter changes in the control signal.

FIG. 8 is a flowchart representative of example machine readable instructions 800 which may be executed by the welding-type system 100, 200, 300 of FIGS. 1, 2, and/or 3 to synergically control the welding-type system 100, 200, 300 based on an control signal and to filter changes in the control signal. The example instructions 800 will be described below with reference to the system 100 of FIG. 1, and begin while a welding operation is not occurring. The instructions 800 may be implemented in conjunction with the instructions 700 of FIGS. 7A and 7B.

At block 802, the control circuitry 112 determines whether a welding operation is being performed. For example, the control circuitry 112 may determine whether at least a threshold value of the control signal is received from a trigger of the welding torch 106 (e.g., the power selector 156), a foot pedal, and/or other control input. If a welding operation is not being performed (block 802), control returns to block 802 to await a welding operation.

If a welding operation is being performed (block 802), at block 804 the control circuitry 112 determines a value of the control signal (e.g., the control signal 158) received from a remote control device (e.g., the power selector 156 of the torch 106).

At block 806, the control circuitry 112 filters changes in the control signal that are less than a noise threshold. Noise may occur due to, for example, environmental noise such as radio frequency and/or other electromagnetic signals, noise resulting from physical instability in the input device generating the control signal, and/or any other source.

In some examples, the control circuitry 112 may filter the noise by establishing a range or window of values based on a received value of the control signal, and treating values within the range of values as a same value. Additionally or alternatively, the control circuitry 112 may filter the noise by weighting sample values of the control signal using weights that are higher for older samples and smaller for newer samples (e.g., up to an upper limit on age of the samples). A weighting filter may therefore reduce the influence of transient changes in the control signal 158 while permitting the operator to change the output level. In still other examples, the control circuitry 112 may apply increasing time constants to the samples of the control signal, such that values that are held longer become more influential in the output value.

At block 808, the control circuitry 112 determines a synergic voltage and wire feed speed based on the filtered value of the control signal. For example, the control circuitry 112 may determine a power level corresponding to the filtered value of the control signal, and calculate or look up (e.g., in a look up table) voltage and wire feed speed parameters corresponding to the power level.

At block 810, the control circuitry 112 controls the power conversion circuitry 110 to convert the input power to welding-type power and outputs the welding-type power to the torch 106 based on the determined voltage and wire feed speed. For example, the control circuitry 112 may control the power conversion circuitry 110 based on the determined voltage and control the wire drive 136 based on the determined wire feed speed.

Control then returns to block 802 to continue while the welding operation continues.

Figure 9:
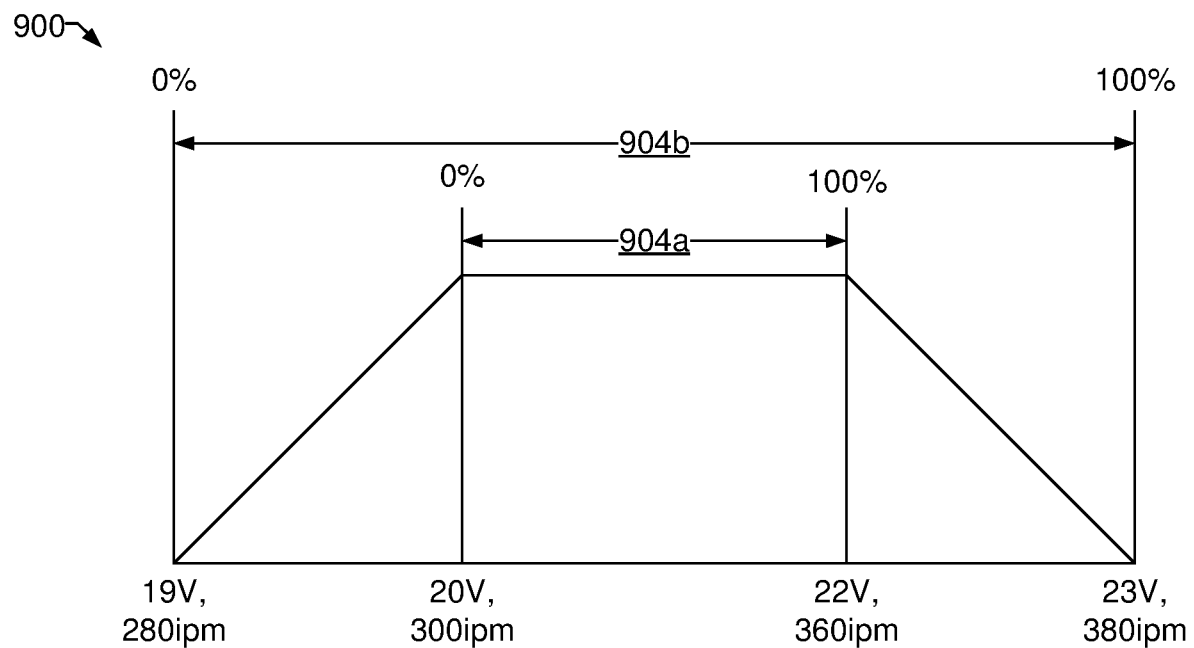
FIG. 9 illustrates an example mapping of an input value range of a control signal of FIGS. 1, 2, and/or 3 to voltage ranges and wire feed speed ranges based on specified physical characteristics of a welding operation.

FIG. 9 illustrates an example mapping 900 of an input value range 904a, 904b of a control signal of FIGS. 1, 2, and/or 3 to voltage ranges and wire feed speed ranges based on specified physical characteristics of a welding operation.

The example control circuitry 112 may determine the mapping 900 to synergically control the output of the power conversion circuitry 110 and the wire feeder 104 to use less than an entire voltage range and less than an entire wire feed speed range. For example, the control circuitry 112 may use physical characteristics of the welding operation to determine a subrange of voltage and wire feed speed for mapping to the range of input values. Example physical characteristics of the weld may include a workpiece thickness, a workpiece material, a wire composition, a wire diameter, and/or a shielding gas composition.

Some conventional welding systems provide a recommended voltage and wire feed speed based on the workpiece thickness, wire composition, wire diameter, and shielding gas composition. The recommended voltage and wire feed speed may be provided with a recommended range of voltage and/or wire feed speed, within which the operator is permitted to adjust the voltage and wire feed speed. The recommended voltage and wire feed speed may also be provided with a permissible range of voltage and/or wire feed speed, which may exceed the bounds of the recommended range of voltage and/or wire feed speed.

The example mapping 900 of FIG. 9 maps the range of inputs of the control signal 158 (e.g., a normalized range 0% to 100%) to a first limit range of voltages and a first limit range of wire feed speeds (limit ranges 904a). In some examples, the first limit range of voltages and the first limit range of wire feed speeds are based on the recommended range of voltage and wire feed speed associated with a recommended voltage and wire feed speed and/or otherwise based on the physical characteristics of the welding operation. In the example of FIG. 9, the lower end of the normalized range corresponds to the lower end of the first limit range of voltages and the first limit range of wire feed speeds (e.g., 20V and 300 ipm), and the upper end of the normalized range corresponds to the upper end of the first limit range 904a of voltage and the first limit range 904a of wire feed speeds (e.g., 22V and 360 ipm).

The example mapping 900 of FIG. 9 alternatively maps the range of inputs of the control signal 158 (e.g., the normalized range 0% to 100%) to a second limit range of voltages and a second limit range of wire feed speeds (subranges 904b). In some examples, the second limit range of voltages and the second limit range of wire feed speeds are based on the permissible range of voltage and wire feed speed (e.g., a wider range than the recommended range, but less than the entire range of voltage and wire feed speed output) associated with a recommended voltage and wire feed speed and/or otherwise based on the physical characteristics of the welding operation. In the example of FIG. 9, the lower end (e.g., the minimum value of the control signal) of the normalized range of the control signal corresponds to the lower end of the second limit range of voltages and the second limit range of wire feed speeds (e.g., 19V and 280 ipm), and the upper end of the normalized range corresponds to the upper end of the second limit ranges 904b of voltage wire feed speed (e.g., 23V and 380 ipm).

As the value of the control signal changes (e.g., within the normalized range of 0 to 100%), the control circuitry 112 controls the output of the power conversion circuitry 110 and the wire feeder 104 proportionally, inversely proportionally, or piecewise proportionally. Mapping the range of values of the control signal to the second limit range 904b causes the control circuitry 112 to increase or decrease the power output (e.g., voltage and wire feed speed) more per unit of change in the value of the control signal compared to the mapping of the range of input values to the first limit range 904a.

Figure 10:
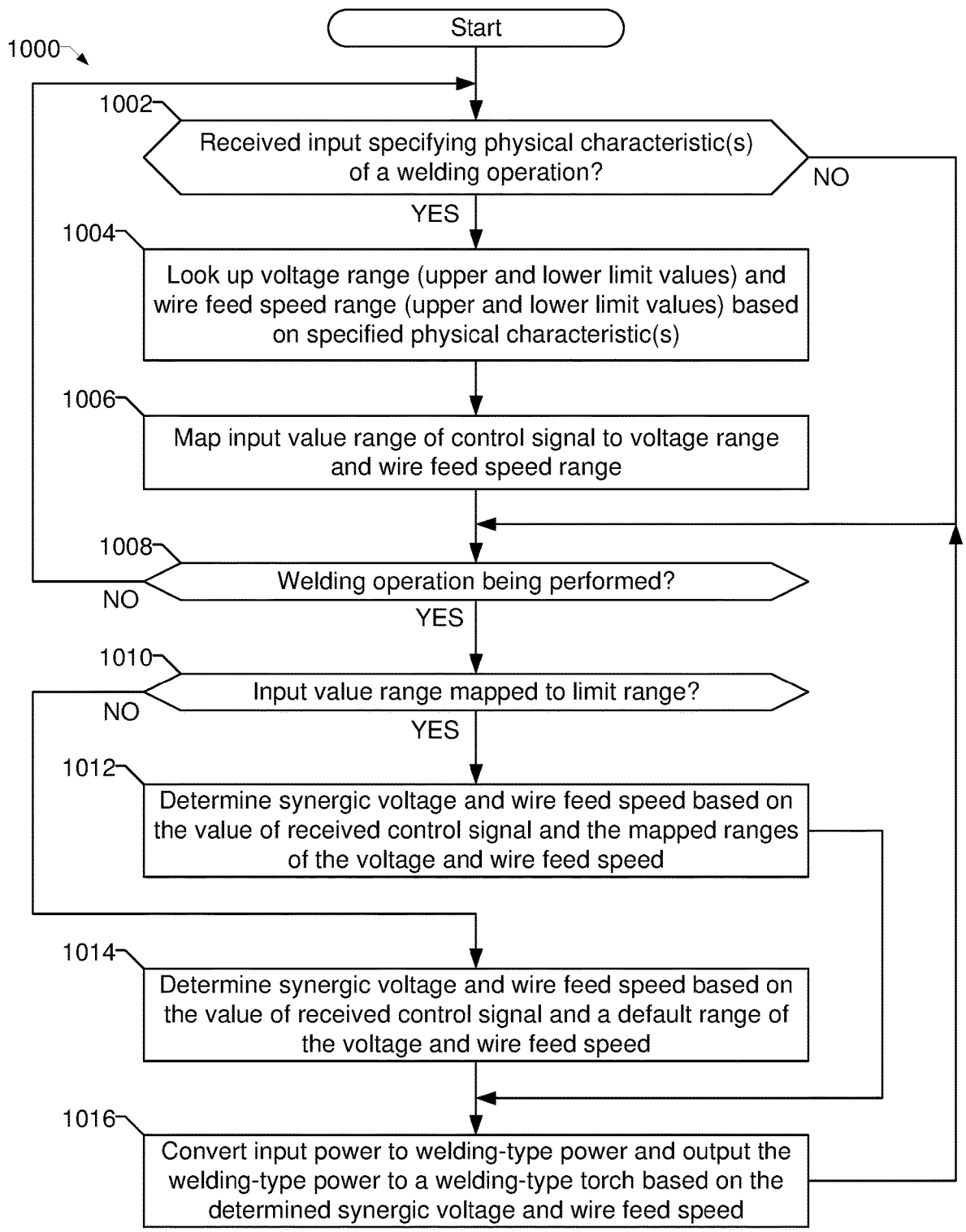
FIG. 10 is a flowchart representative of example machine readable instructions which may be executed by the welding-type system of FIGS. 1, 2, and/or 3 to synergically control the welding-type system within a range of values, in which the range is determined based on characteristics of the workpiece.

FIG. 10 is a flowchart representative of example machine readable instructions 1000 which may be executed by the welding-type system of FIGS. 1, 2, and/or 3 to synergically control the welding-type system within a range of values, in which the range is determined based on characteristics of the workpiece. The example instructions 1000 will be described below with reference to the system 100 of FIG. 1, and begin while a welding operation is not occurring. The instructions 1000 may be implemented in conjunction with the instructions 700, 800 of FIGS. 7A and 7B and/or 8.

At block 1002, the control circuitry 112 determined whether an input specifying one or more physical characteristics of a welding operation has been received. For example, the input may be received via the user interface 114 and/via the communications transceiver 118 (e.g., from the wire feeder 104 and/or from another device). The specified physical characteristics may include one or more of a workpiece thickness, a workpiece material type, a wire type, a wire diameter, or a shielding gas type.

If an input specifying one or more physical characteristics of a welding operation has been received (block 1002), at block 1004 the control circuitry 112 looks up a voltage range (e.g., upper and lower limit values) and a wire feed speed range (e.g., upper and lower limit values) based on the specified physical characteristics. For example, the voltage range and wire feed speed range may be based on a recommended range, a permissible range, and/or any other range determined based on the specified physical characteristic(s).

At block 1006, the control circuitry 112 maps the input value range of the control signal to the determined voltage range and wire feed speed range. For example, the control circuitry 112 may map the lower end of the input value range (e.g., 0% of normalized range, 10% of normalized range, etc.) to the lower end of the limit ranges of the voltage and wire feed speed, and map the upper end of the input value range to the upper end of the limit ranges of the voltage and wire feed speed. The example control circuitry 112 may then interpolate between the upper and lower limits based on the value of the control signal relative to the input value range.

After mapping the input value range (block 1006), or if no inputs specifying the physical characteristics have been received (block 1002), at block 1008 the control circuitry 112 determines whether a welding operation is being performed. For example, the control circuitry 112 may determine whether at least a threshold value of the control signal is received from a trigger of the welding torch 106 (e.g., the power selector 156), a foot pedal, and/or other control input. If a welding operation is not being performed (block 1008), control returns to block 1002 to await an input and/or the start of a welding operation.

If a welding operation is being performed (block 1008), at block 1010 the control circuitry 112 determines whether the input value range is mapped to a limit range. If the input value range is mapped to a limit range (block 1010), at block 1012 the control circuitry 112 determines a synergic voltage and wire feed speed based on the value of the received control signal and the mapped ranges of the voltage and wire feed speed. For example, the control circuitry 112 may interpolate the values of the voltage and wire feed speed from the mapped limit ranges of the voltage and wire feed speed based on the value of the control signal 158 relative to the input value range.

On the other hand, if the input value range is not mapped to a limit range (block 1010), at block 1014 the control circuitry 112 determines a synergic voltage and wire feed speed based on the value of the received control signal and default ranges of the voltage and wire feed speed. The example default range may be an entire voltage range and an entire wire feed speed range of the system 100, a manually selected range, and/or a range determined based on other parameters.

After determining the synergic voltage and wire feed speed based on the mapped ranges (block 1012) or the default range (block 1014), at block 1016 the control circuitry 112 controls the power conversion circuitry 110 to convert the input power to welding-type power and outputs the welding-type power to the welding torch 106 based on the determined synergic voltage and wire feed speed. For example, the control circuitry 112 may control the power conversion circuitry 110 based on the determined voltage and control the wire drive 136 based on the determined wire feed speed. Control then returns to block 1008 to determine whether the welding operation continues.

Figure 11:
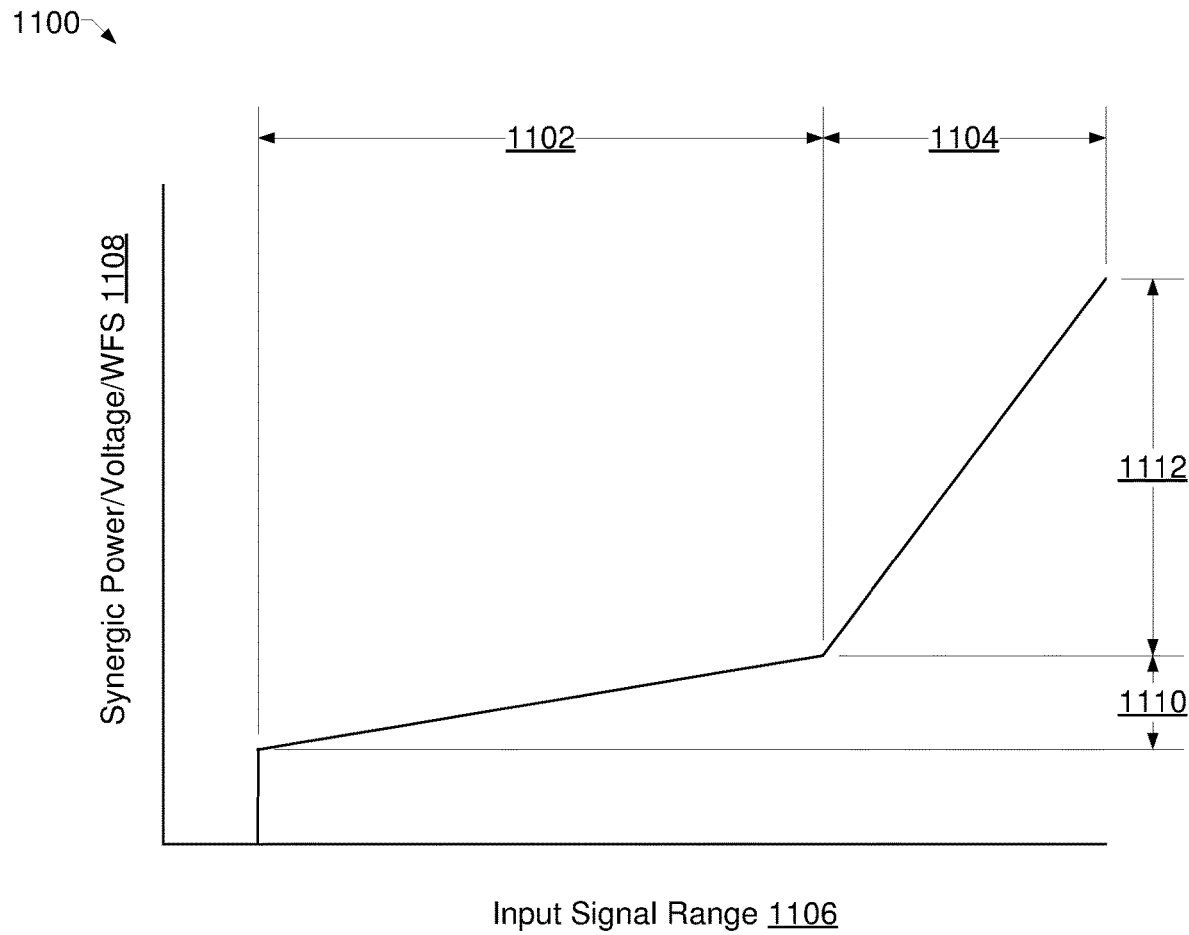
FIG. 11 illustrates an example mapping of multiple sub-ranges of an input signal range of the control signal of FIGS. 1, 2, and/or 3 to different power ranges, voltage ranges, and/or wire feed speed ranges for performing synergic control of the welding-type system based on an input value of the control signal.

FIG. 11 illustrates an example mapping 1100 of multiple subranges 1102, 1104 of an input signal range 1106 of the control signal 158 of FIGS. 1, 2, and/or 3 to different power ranges, voltage ranges, and/or wire feed speed ranges (e.g., synergic outputs 1108) for performing synergic control of the welding-type system 100 based on an input value of the control signal 158.

In the example of FIG. 11, different subranges of the input signal range 1106 have different rates of change of the synergic output (e.g., power, voltage, wire feed speed) per unit change of the value of the control signal 158. For example, the first subrange 1102 of the input signal range 1106 is a larger portion of the input signal range 1106 than the second subrange 1104, but is mapped to a smaller subrange 1110 of the synergic output range 1108 of the input signal range 1106 than the second subrange 1104. As a result, while the control signal 158 is within the first subrange 1102, a unit of change in the control signal 158 will result in a smaller change in the synergic output 1108 than while the control signal 158 is within the second subrange 1104.

In the example mapping 1100, the lower subrange 1102 of the control signal 158 provide a greater granularity of control than in the higher subrange 1104. However, other mappings may be used based on selection or specification by the user (e.g., via the user interface 114 and/or via configuration received from the wire feeder 104 and/or another remote configuration device via the communications transceiver 118), or automatic configuration based on weld characteristics. For example, the operator may desire to have a greater degree of control in the higher-output subranges of the input signal range 1106 and/or in a middle subrange of the input signal range. In some examples, the operator may select the number and/or limits of the subranges 1102, 1104, and/or select the limits of the corresponding synergic output subranges 1110, 1112.

Figure 12:
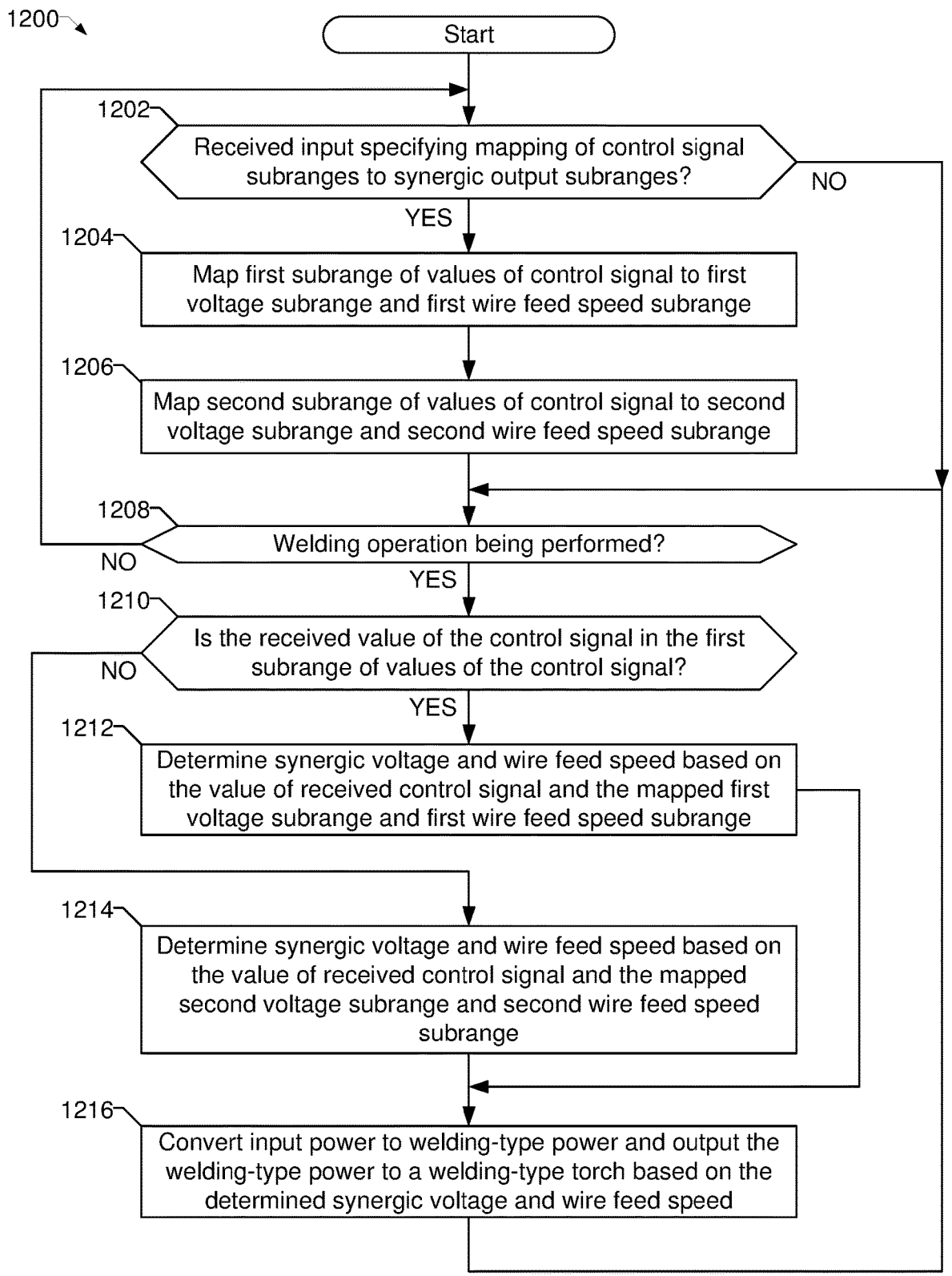
FIG. 12 is a flowchart representative of example machine readable instructions which may be executed by the welding-type system of FIGS. 1, 2, and/or 3 to synergically control the welding-type system using multiple subranges for a range of input signals.

FIG. 12 is a flowchart representative of example machine readable instructions 1200 which may be executed by the welding-type system 100 of FIGS. 1, 2, and/or 3 to synergically control the welding-type system 100 using multiple subranges for a range of input signals. For example, the control circuitry 112 of FIG. 1 may execute the instructions 1200 to configure mappings of subranges of the control signal 158 to subranges 1110, 1112 of the synergic power, voltage, and/or wire feed speed, such as the mapping 1100 of FIG. 11.

At block 1202, the control circuitry 112 determines whether an input specifying a mapping of control signal subranges (e.g., the subranges 1102, 1104) to synergic output subranges (e.g., subranges 1110, 1112) has been received. For example, the input may be received via the user interface 114 and/via the communications transceiver 118 (e.g., from the wire feeder 104 and/or from another device). If an input specifying a mapping of control signal subranges to synergic output subranges has been received (block 1202), at block 1204 the control circuitry 112 maps a first subrange of values of the control signal (e.g., the subrange 1102) to a first voltage subrange and a first wire feed speed subrange (e.g., the subrange 1110). At block 1206, the control circuitry 112 maps a second subrange of values of the control signal (e.g., the subrange 1104) to a first voltage subrange and a second wire feed speed subrange (e.g., the subrange 1112).

After the mapping (block 1206), or if an input specifying the mapping is not received (block 1202), at block 1208 the control circuitry 112 determines whether a welding operation is being performed. For example, the control circuitry 112 may determine whether at least a threshold value of the control signal is received from a trigger of the welding torch 106 (e.g., the power selector 156), a foot pedal, and/or other control input. If a welding operation is not being performed (block 1208), control returns to block 1202 to await an input and/or the start of a welding operation.

If a welding operation is being performed (block 1208), at block 1210 the control circuitry 112 determines whether the received value of the control signal 158 is within the first subrange of values of the control signal. If the received value of the control signal 158 is within the first subrange of values of the control signal (e.g., subrange 1102) (block 1210), at block 1212 the control circuitry 112 determines a synergic voltage and wire feed speed based on the value of the received control signal and the mapped first voltage subrange and first wire feed speed subrange (e.g., the subrange 1110). For example, the control circuitry 112 may interpolate the voltage and wire feed speed based on the upper and lower end values of the subrange 1102 and the upper and lower values of the voltage and wire feed speed subrange 1110.

On the other hand, if the received value of the control signal 158 is not within the first subrange of values of the control signal (e.g., the received value is within the second subrange 1104) (block 1210), at block 1214 the control circuitry 112 determines a synergic voltage and wire feed speed based on the value of the received control signal and the mapped second voltage subrange and second wire feed speed subrange (e.g., the subrange 1112). For example, the control circuitry 112 may interpolate the voltage and wire feed speed based on the upper and lower end values of the subrange 1104 and the upper and lower values of the voltage and wire feed speed subrange 1112.

After determining the synergic voltage and wire feed speed (block 1212 or 1214), at block 1216 the control circuitry 112 controls the power conversion circuitry 110 to convert the input power to welding-type power and outputs the welding-type power to the welding torch 106 based on the determined synergic voltage and wire feed speed. For example, the control circuitry 112 may control the power conversion circuitry 110 based on the determined voltage and control the wire drive 136 based on the determined wire feed speed. Control then returns to block 1208 to determine whether the welding operation continues.

While the example instructions 1200 are described with reference to two subranges of values of the control signal, in other examples the instructions 1200 may be modified to accommodate 3 or more subranges.

While the examples disclosed above are described with reference to synergic voltage and wire feed speed, the disclosed systems and methods may control other parameters based on, for example, the type of welding-type operation being performed. For example, instead of or in addition to controlling voltage, disclosed systems and methods may synergically control current with one or more other parameters.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
    power conversion circuitry configured to convert input power to welding-type power and to output the welding-type power to a welding-type torch;
    communications circuitry configured to receive a control signal from a remote control device during a welding-type operation, wherein the control signal is representative of a value within a first predetermined range of values; and
    control circuitry configured to:
        determine, based on at least one physical characteristic of a welding operation, a first limit range of a first one of: a voltage of a welding-type power output by the power conversion circuitry, a current of the welding-type power, or a wire feed speed;
        determine, based on the at least one physical characteristic of the welding operation, a second limit range of a second one of: the voltage of the welding-type power output by the power conversion circuitry, the current of the welding-type power, or the wire feed speed;
        map the first limit range and the second limit range to the first predetermined range of values by:
            mapping a first end of the first limit range and a first end of the second limit range to a first value in the first predetermined range of values of the control signal; and
            mapping a second end of the first limit range and a second end of the second limit range a second value in the first predetermined range of values of the control signal; and
        during the welding-type operation, synergically control the first one and the second one of the voltage, the current, or the wire feed speed within the first limit range and within the second limit range based on the value of the control signal within the first predetermined range of values and based on a specified relationship between the first one and the second one of the voltage, the current, or the wire feed speed.

2. The welding-type power supply as defined in claim 1, wherein the at least one physical characteristic of the welding operation comprises at least one of a workpiece thickness, a workpiece material type, a wire type, a wire diameter, or a shielding gas type.

3. The welding-type power supply as defined in claim 1, wherein the control circuitry is configured to synergically control the voltage and the wire feed speed by:
    setting a commanded power level of the welding-type power based on the control signal;
    determining the voltage and the wire feed speed corresponding to the commanded power level;
    controlling the power conversion circuitry to output the voltage; and
    controlling a wire feeder based on the wire feed speed.

4. The welding-type power supply as defined in claim 1, wherein the communications circuitry is configured to receive the control signal from at least one of the welding-type torch or a foot pedal.

5. The welding-type power supply as defined in claim 1, wherein the control circuitry is configured to control an output to provide at least one of a visual indicator, an audible indicator, or a haptic indicator based on the control signal.

6. The welding-type power supply as defined in claim 1, wherein the control circuitry is configured to, in response to a control signal hold command, synergically control the voltage of the welding-type power and the wire feed speed based on a hold value of the control signal corresponding to the value of the control signal associated with the control signal hold command.

7. The welding-type power supply as defined in claim 1, wherein the control circuitry is configured to filter changes in the control signal that are less than a noise threshold.

8. The welding-type power supply as defined in claim 1, wherein the control circuitry is configured to determine the at least one physical characteristic of the welding operation based on an input to a user interface or received via the communications circuitry.

9. The welding-type power supply as defined in claim 1, wherein the first limit range is less than an entire voltage range of the power conversion circuitry and the second limit range is less than an entire wire feed speed range of a wire feeder controlled by the control circuitry.

10. The welding-type power supply as defined in claim 1, wherein the first limit range and the second limit range correspond to values between the first value and the second value.

11. The welding-type power supply as defined in claim 1, wherein the control circuitry is configured to look up the first end and the second end of the first limit range and the first end and the second end of the second limit range in a lookup table.

12. The welding-type power supply as defined in claim 11, wherein the control circuitry is configured to synergically control the first one and the second one of the voltage, the current, or the wire feed speed by interpolating between the first end and the second end of the first limit range based on the value of the control signal relative to the first predetermined range of values, and interpolating between the first end and the second end of the second limit range, based on the value of the control signal relative to the first predetermined range of values.

13. The welding-type power supply as defined in claim 1, wherein the first value in the first predetermined range of values is a minimum value of the first predetermined range of values.

14. The welding-type power supply as defined in claim 1, wherein the second value in the first predetermined range of values is a maximum value of the first predetermined range of values.

* * * * *